US006630554B1

(12) United States Patent
Hamada et al.

(10) Patent No.: US 6,630,554 B1
(45) Date of Patent: Oct. 7, 2003

(54) PROCESS FOR POLYMERIZING A METHACRYLIC ESTER OR AN ACRYLIC ESTER

(75) Inventors: Kenichi Hamada, Tsukuba (JP); Kazushige Ishiura, Tsukuba (JP); Toru Takahashi, Tsukuba (JP); Sachie Yaginuma, Tsukuba (JP); Makoto Akai, Tsukuba (JP); Tomohiro Ono, Tsukuba (JP); Kenji Shachi, Kashima-gun (JP)

(73) Assignee: Kuraray Co., Ltd., Kurashiki (JP)

(*) Notice: Subject to any disclaimer, the term of this patent is extended or adjusted under 35 U.S.C. 154(b) by 0 days.

(21) Appl. No.: 09/664,336

(22) Filed: Sep. 18, 2000

(30) Foreign Application Priority Data

Sep. 20, 1999 (JP) ............................................ 11-264869

(51) Int. Cl.$^7$ .................................................. C08F 4/52
(52) U.S. Cl. ...................... 526/187; 526/176; 526/177; 526/178; 526/319; 526/329.7; 525/247; 525/279; 525/299; 525/309
(58) Field of Search ................................. 526/177, 176, 526/178, 319, 187, 329.7, 189; 525/279, 247, 299, 309

(56) References Cited

U.S. PATENT DOCUMENTS

| 3,716,495 | A | 2/1973 | Hsieh |
| 5,180,799 | A | 1/1993 | Ballard et al. |
| 5,514,753 | A | 5/1996 | Ozawa et al. |
| 5,656,704 | A | 8/1997 | Wang et al. |
| 5,670,592 | A | 9/1997 | Teyssie et al. |

FOREIGN PATENT DOCUMENTS

| DE | 196 48 565 | 5/1998 |
| JP | 7-57766 | 6/1995 |
| WO | WO 98/23651 | 6/1998 |

OTHER PUBLICATIONS

Hai Deng, et al., Database Compendex Engineering Information, Proceedings of the 1996 ACS New Orleans Meeting, vol. 37, No. 1, 1 page, "Isotactic Polymerization of (Meth)Acrylates With ANSA–Zirconocene", Mar. 24–29, 1996 (Abstract Only).

Helmut Schlaad, et al. "Mechanism of Anionic Polymerization of (Meth) acrylates in the Presence of Aluminum Alkyls. 5. Effect of Lewis Bases on Kinetics and Molecular Weight Distributions †". Macromolecules 1998, vol. 31, pp. 573–577.

T. Kitayama, et al. Anionic Polymerization of Acrylates with t–BuLi/Aluminum Phenoxide and Copolymerization with Methacrylate. Polymer Preprints, Japan vol. 46, No. 7 (1997) pp. 1081–1082.

S. K. Varshney, et al. "Anionic Polymerization of (Meth-)acrylic Monomers. 4.†Effect of Lithium Salts as Ligands on the "Living" Polymerization of Methyl Methacrylate Using Monofunctional Initiators". Macromolecules 1990, vol. 23, pp. 2618–2622.

T. Kityama, et al. "Living Polymerization Alkyl Acrylates with t–Buli/Alkylaluminum Phenoxide and Copolymerization with Methacrylate". Polymer Preprints, Japan vol. 47, No. 2 (1998) p. 179.

Tatsuki Kitayama, et al., Polymer Journal, vol. 26, No. 7, pp. 868–872, "Preparation of Highly Heterotactic Polymethacrylate With Narrow Molecular Weight Distribution By t–Butyllithium/BIS(2,6–di–t–Butylphenoxy)Methylaluminum in Toluene", 1994.

C.L. Almeida, et al., Database Compendex Engineering Information, vol. 47, No. 4, 1 page, "Anionic Polymerization of Dienes Using Oligobutadienyl–Lithium as Initiator", Dec. 1998 (Abstract only).

*Primary Examiner*—Tatyana Zalukaeva
(74) *Attorney, Agent, or Firm*—Oblon, Spivak, McClelland, Maier & Neustadt, P.C.

(57) ABSTRACT

(1) A methacrylic ester or an acrylic ester is anionically polymerized, using a polymerization initiator compound comprising an addition reaction product of a conjugated diene compound and an organic alkali metal compound, in the presence of a tertiary organoaluminum compound having in the molecule thereof a chemical structure represented by a formula: Al—O—Ar wherein Ar represents an aromatic ring; or (2) a methacrylic ester or an acrylic ester is anionically polymerized, using a polymerization initiator compound comprising an addition reaction product of an organic alkali metal compound and a compound having a 1,1-diaryl-1-alkene structure, by adding the ester in the form of a mixture with the above-mentioned specific tertiary organoaluminum compound to the polymerization system.

In this way, various species of the esters can be anionically polymerized with a high initiation efficiency and a high living polymerization property in a solvent which can easily be recovered and reused under a mild cooling condition, using an organic alkali metal compound which has relatively good convenience.

15 Claims, 1 Drawing Sheet

PROCESS FOR POLYMERIZING A METHACRYLIC ESTER OR AN ACRYLIC ESTER

BACKGROUND OF THE INVENTION

1. Field of the Invention

The present invention relates to a polymerization process giving superior reaction results such as initiation efficiency, comprising an anionic polymerization of a methacrylic ester or an acrylic ester in the presence of a specific organoaluminum compound, using a specific polymerization initiator compound. The present invention also relates to a process for producing a polymer such as a block copolymer, wherein the above-mentioned polymerization process is used.

2. Related Art of the Invention

Not only realization of high living polymerization property but also an improvement in initiation efficiency are important for anionic polymerization. The improvement in the initiation efficiency is especially important for synthesis of a block copolymer as well as enhancement of use efficiency of a polymerization initiator compound. For example, the following process is assumed: a process for synthesizing a block copolymer comprising a polymer block resulting from a certain kind of monomer (hereinafter referred to as a first monomer) and another polymer block resulting from another kind of monomer (hereinafter referred to as a second monomer), comprising polymerizing the first monomer to synthesize a living polymer, and then polymerizing the second monomer by use of the living monomer as a polymerization initiator compound. If the initiation efficiency of the living polymer (block efficiency in this case) is low, a product which is actually obtained is a mixture of the block copolymer and a polymer resulting from the first monomer. In many cases, the above-mentioned impurity produced by interruption of the polymerization causes a remarkable drop in performances of the block copolymer. It is known that, for example, a triblock copolymer having a structure of a hard block/a soft block/a hard block has properties as a thermoplastic elastomer. If a polymer having only a hard block or a diblock copolymer having a structure of a hard block/a soft block is mixed with this type triblock copolymer, mechanical properties such as tensile strength drop. Block copolymers are frequently used as compatibilizer for different resins. However, if a homopolymer is mixed with a used block copolymer, the function as the compatibilizer deteriorates so that good points which respective resins originally have in a resultant resin composition are not sufficiently exhibited.

As a process for heightening initiation efficiency in anionic polymerization of a methacrylic ester or an acrylic ester, there is known a process comprising the steps of subjecting an organic alkali metal compound, for example, an alkyl lithium such as butyllithium, or a lithiated polymer such as polystyryllithium to addition reaction with 1,1-diphenylethylene or α-methylstyrene to prepare a compound having, at its terminal site, a diphenylmethylene anion structure or a phenylmethylene anion structure; and then polymerizing a methacrylic ester anionically in a solvent comprising tetrahydrofuran alone or a mixture of tetrahydrofuran and toluene at a low temperature, for example, −60° C. or lower, using the above-mentioned compound as a polymerization initiator compound (Macromolecules, Vol. 23, pp. 2618–2622 (1990)). A polar solvent, such as tetrahydrofuran used in this process, is easily mixed in waste water at the time of washing with water after the polymerization, and further is not easily separated from the waste water. Therefore, the polar solvent is not suitable for industrial use. As a result, in order to carry out industrially anionic polymerization in a solution of a methacrylic ester or an acrylic ester, it is desired to use a nonpolar solvent, such as a hydrocarbon based solvent, as a solvent.

As a process for making it possible to polymerize a methacrylic ester or an acrylic ester anionically in a hydrocarbon based solvent, a process wherein an organoaluminum compound causes to be present in the polymerization system is suggested. It is considered that in this case, the organoaluminum compound has a function of lowering nucleophilicity of the growing terminal of the polymer and stabilizing the growing terminal by coordination, as a Lewis acid, to a used polymerization initiator compound or the growing terminal of the living polymer in the middle of the polymerization. Examples of reports on such a polymerization process are as follows.

(1) Anionic polymerization of a methacrylic ester using tert-butyllithium was conducted in the presence of an organoaluminum compound such as a trialkylaluminum or a dialkyl(diphenylamino)aluminum in toluene at −78° C. to obtain a methacrylic ester polymer having a narrow molecular weight distribution (JP-B-H7-57766).

(2) Anionic polymerization of a methacrylic ester using an organolithium compound such as tert-butyllithium was conducted in the presence of a specific organoaluminum compound having one or more bulky groups (for example, triisobutylaluminum or diisobutyl(2,6-di-tert-butyl-4-methylphenoxy)aluminum) in a hydrocarbon solvent at a temperature of about −10° C., which is a relatively mild cooling condition(U.S. Pat. No. 5,180,799).

(3) Anionic polymerization of a methacrylic ester or an acrylic ester using tert-butyllithium was conducted in the presence of methylbis(2,6-di-tert-butylphenoxy)aluminum or ethylbis(2,6-di-tert-butylphenoxy)aluminum in toluene at a temperature of −60° C. or −70° C. to obtain a homopolymer or a block copolymer having a narrow molecular weight distribution (Polymer Preprints. Japan, Vol. 46, No. 7, pp. 1081–1082 (1997) and Vol. 47, No. 2, p.179 (1998)).

(4) An organolithium compound such as tert-butyllithium, sec-butyllithium, ethyl α-lithioisobutyrate, 1,1-diphenylhexyllithium was mixed with an organoaluminum compound such as methylbis(2,6-di-tert-butylphenoxy)aluminum, ethylbis(2,6-di-tert-butylphenoxy)aluminum or tris(2,6-di-tert-butylphenoxy)aluminum, and then the mixture was brought into contact with methyl methacrylate to anionically polymerize methyl methacrylate in a nonpolar organic solvent such as toluene at about room temperature. In this way, an initiation efficiency of 0.05–0.63 was attained (U.S. Pat. No. 5,656,704).

(5) Anionic polymerization of a methacrylic ester or an acrylic ester using an organolithium compound such as methyl α-lithioisobutyrate or tert-butyllithium was conducted in the presence of an organoaluminum compound, such as a trialkylaluminum, and an ester compound, an ether compound or an organic quaternary salt in a hydrocarbon based solvent such as toluene at a temperature of about −80° C. to 0° C., so as to obtain a polymer having a narrow molecular weight distribution (Macromolecules, Vol. 31, pp. 573–577 (1998) and International Publication WO98/23651).

(6) An organolithium compound such as n-butyllithium was subjected to addition-reaction with butadiene to prepare polybutadienyllithium, and then the polybutadienyllithium was reacted with tert-butyl methacrylate in the presence of a trialkylaluminum such as triethylaluminum at 50° C., so as to obtain a block copolymer (U.S. Pat. No. 5,514,753).

According to the above-mentioned processes (1)–(6), anionic polymerization of a methacrylic ester or an acrylic ester can be attained in a hydrocarbon based solvent. However, in order to use these processes as industrial polymerization processes, they have the following points to be further improved.

The polymerization initiator compound used to polymerize a methacrylic ester or an acrylic ester in specific polymerization examples in the above-mentioned (1)–(3) processes is limited to tert-butyllithium. It can be presumed that in order to attain good polymerization results in these polymerization examples, it is preferred to use tert-butyllithium. However, tert-butyllithium has intense self-ignition ability. Thus, if tert-butyllithium is industrially used, problems about safety and handling performances thereof upon transportation and storage thereof arise.

In the processes (1) and (3), the polymerization temperatures used in specific polymerization examples therein are very low temperatures, such as about −80 to −60° C. It can be presumed that in order to attain good polymerization results in these polymerization processes, it is preferred to use very low temperatures as described above. However, many utilities are necessary for cooling to such temperatures; therefore, the processes are industrially disadvantageous.

In the process (4), almost all of the initiation efficiencies in specific. polymerization examples of methyl methacrylate are 0.5 or less even in examples wherein tert-butyllithium, which can give relatively good polymerization results, is used as a polymerization initiator compound. In an example wherein sec-butyllithium, which is a polymerization initiator compound that is relatively good in handling performance, is used, the initiation efficiency thereof is 0.17. Thus, the initiation efficiencies are on an insufficient level.

The polymerization initiator compounds used in specific examples in the process (5) are limited to tert-butyllithium and ethyl α-lithioisobutyrate. It can be presumed that in order to attain good polymerization results, it is preferred to use these polymerization initiator compounds. As described above, tert-butyllithium has problems for industrial use from the standpoint of safety and handling performance. Synthesis operation for producing ethyl α-lithioisobutyrate and subsequent purification operation are complicated. Therefore, it is difficult to say that ethyl α-lithioisobutyrate is suitable for industrial use.

The inventor et al. tried to reproduce the process (6) experimentally, but could not obtain desired results. Th at is, the inventor et al. prepared specified polybutadienyllithium on the basis of the specific production examples described as the process (6), and then reacted the polybutadienyllithium with tert-butyl methacrylate in the presence of triethylaluminum at 50° C., but the initiation efficiency of the polybutadienyllithium was low in the present polymerization system. A finally obtained product was a mixture of a block copolymer and polybutadiene. Accordingly, the process (6) has problems when this process is adopted for industrial production for which high reproducibility is required.

Furthermore, the inventor et al. made experimental investigations on the processes (1)–(6). As a result, it was proved that polymerization of esters of a primary alcohol and methacrylic acid or acrylic acid, such as methyl methacrylate and n-butyl acrylate, does not advance in many cases, or that even if polymerization reaction thereof advances, reaction results such as initiation efficiency and living polymerization property drop as compared with polymerization of esters of a tertiary alcohol and methacrylic acid, such as tert-butyl methacrylate.

1,1-Diphenylethylene has no polymerizing ability, and addition reaction of 1,1-diphenylethylene of one molecule with a monovalent anionic compound of one molecule gives an addition reaction product. This addition reaction product has relatively low nucleophilicity and is a stable anionic compound. For this reason, 1,1-diphenylethylene is useful as an anionic modifying agent for alkali metal compounds or a terminal modifying agent for living polymers. As an example of the process (4), there is described an example wherein methyl methacrylate is polymerized, using 1,1-diphenylhexyllithium, which corresponds to an addition reaction product of 1,1-diphenylethylene and n-butyllithium, as a polymerization initiator agent. However, the initiation efficiency thereof is a low value of 0.5 or less.

In order to make anionic polymerization of a methacrylic ester or an acrylic ester suitable for industrial accomplishment, the following are important: living polymerization property is high; initiation efficiency (block efficiency in the case of a block copolymerization) is high; a hydrocarbon based solvent can be used as a solvent media for the polymerization; the scope of polymerization initiator compounds or precursors thereof (organic alkali metal compounds) that can be used is wide; and cooling conditions upon the polymerization can be made mild. Furthermore, a process making it possible to polymerize an ester of a primary alcohol and methacrylic acid or acrylic acid while satisfying these requirements is desired as an industrial production process from the standpoint of highly wide use.

SUMMARY OF THE INVENTION

An object of the present invention is to provide a polymerization process making it possible to attain high initiation efficiency (block efficiency in the case of a block copolymerization) and high living polymerization property even when in anionic polymerization of a methacrylic ester or an acrylic ester, an ester of a primary alcohol and methacrylic acid or acrylic acid, which is in general liable to give lowered polymerization results, is used, a compound which is relatively good in safety and handling performance is used as a polymerization initiator compound or a precursor thereof, a hydrocarbon based solvent which can easily be recovered and reused is used as a solvent media for polymerization and a relatively high temperature condition (that is, a relatively mild cooling condition) is adopted as polymerization temperature. According to this polymerization process, it is possible to produce a polymer having a narrow molecular weight distribution and produce a block copolymer containing a small quantity of impurities such as a homopolymer.

Another object of the present invention is to provide a process for producing a polymer with industrial advantage, using the polymerization process having the above-mentioned superior advantages.

The inventors et al. made eager investigations to attain the above-mentioned objects. As a result, it has been found that by conducting anionic polymerization of a methacrylic ester or an acrylic ester in the presence of a specific organoaluminum compound using a specific polymerization initiator compound, it is possible to attain the above-mentioned theme about the application scopes of the methacrylic ester or acrylic ester, the polymerization initiator compound (or the precursor thereof) and the solvent media for polymerization, the above-mentioned theme about the polymerization condition (temperature condition) and the above-mentioned polymerization results (the initiation efficiency and the living polymerization property). The inventor et al. have found that by adding a methacrylic ester or an acrylic ester, as well as a specific organoaluminum compound, to an anionic polymerization system containing a specific polymerization initiator compound, it is also possible to attain the above-mentioned theme about the application scopes of the methacrylic ester or acrylic ester, the polymerization initiator compound (or the precursor thereof) and the solvent media for polymerization, the above-mentioned theme about the polymerization condition (temperature condition) and the above-mentioned polymerization results (the initiation efficiency and the living polymerization property). On the basis of these findings, the inventors have made the present invention.

That is, a first aspect of the present invention is a polymerization process for polymerizing a methacrylic ester or an acrylic ester anionically, using a polymerization initiator compound, wherein an addition reaction product of a conjugated diene compound and an organic alkali metal compound is used as the polymerization initiator compound, and a tertiary organoaluminum compound having in the molecule thereof a chemical structure represented by a formula: Al—O—Ar wherein Ar represents an aromatic ring is caused to be present in the polymerization system (this polymerization process is referred to as a "polymerization process (X)" hereinafter).

A second aspect of the present invention is a process for producing a polymer, comprising polymerizing a methacrylic ester or an acrylic ester by the polymerization process (X).

A third aspect of the present invention is a polymerization process for polymerizing a methacrylic ester or an acrylic ester anionically, using a polymerization initiator compound, wherein an addition reaction product of a compound having a 1,1-diaryl-1-alkene structure and an organic alkali metal compound is used as the polymerization initiator compound; and the methacrylic ester or the acrylic ester is mixed with a tertiary organoaluminum compound having in the molecule thereof a chemical structure represented by a formula: Al—O—Ar wherein Ar represents an aromatic ring, and then the resultant mixture is added to the polymerization system (this polymerization process is referred to as a "polymerization process (Y)" hereinafter).

A fourth aspect of the present invention is a process for producing a polymer, comprising polymerizing a methacrylic ester or an acrylic ester by the polymerization process(Y).

DETAILED DESCRIPTION OF THE INVENTION

Figure 1:
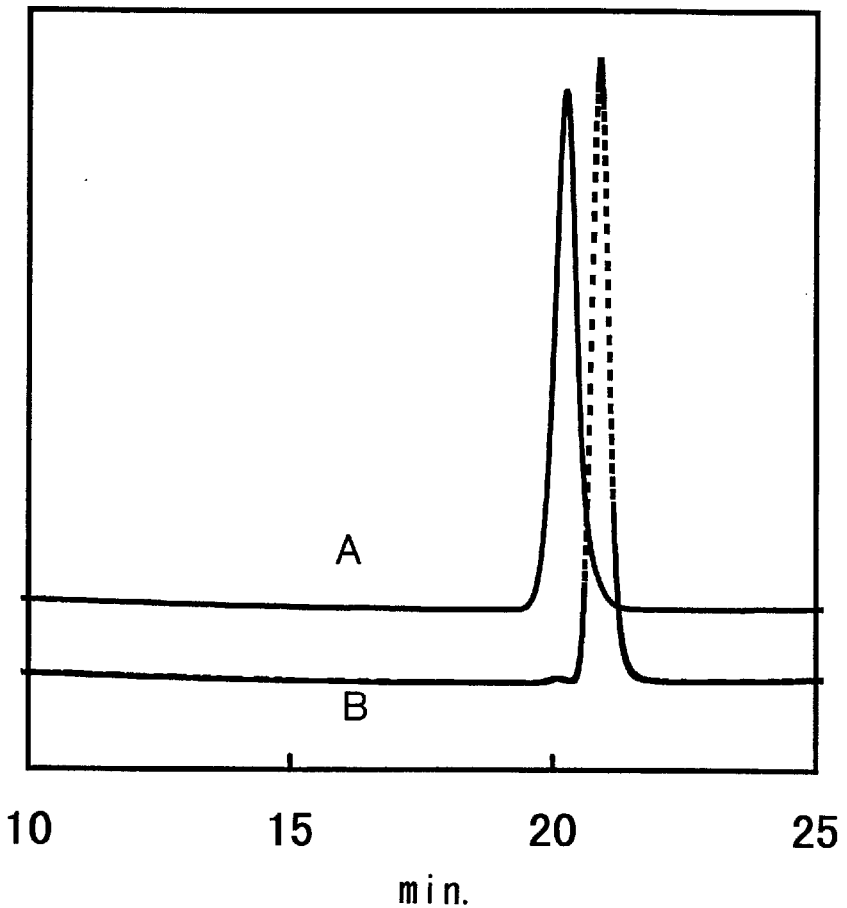
FIG. 1(A) is a GPC chart of an isoprene/n-butyl acrylate diblock copolymer obtained finally in Example 10 according to the polymerization process (X) of the present invention.
FIG. 1(B) is a GPC chart of polyisoprene prepared in a first step for producing this diblock copolymer. Transverse axes represent retention time.

The present invention will be in detail described hereinafter.

A methacrylic ester or an acrylic ester which is a monomer in the polymerization processes (X) and (Y) according to the present invention is not limited to specified species [the above-mentioned ester may be referred to as a "(meth) acrylic ester" hereinafter]. Thus, various species thereof can be used. Specific examples of the methacrylic ester include esters of a primary alcohol and methacrylic acid, such as methyl methacrylate, ethyl methacrylate, propyl methacrylate, n-butyl methacrylate, isobutyl methacrylate, hexyl methacrylate, 2-ethylhexyl methacrylate, dodecyl methacrylate, lauryl methacrylate, methoxyethyl methacrylate, dimethylaminoethyl methacrylate, diethylaminoethyl methacrylate, glycidyl methacrylate, trimethoxysilylpropyl methacrylate, trifluoromethyl methacrylate, trifluoroethyl methacrylate; esters of a secondary alcohol and methacrylic acid, such as isopropyl methacrylate, cyclohexyl methacrylate and isobornyl methacrylate; and esters of a tertiary alcohol and methacrylic acid, such as tert-butyl methacrylate. Specific examples of the acrylic ester include esters of a primary alcohol and acrylic acid, such as methyl acrylate, ethyl acrylate, propyl acrylate, n-butyl acrylate, isobutyl acrylate, hexyl acrylate, 2-ethylhexyl acrylate, dodecyl acrylate, lauryl acrylate, methoxyethyl acrylate, dimethylaminoethyl acrylate, diethylaminoethyl acrylate, glycidyl acrylate, trimethoxysilylpropyl acrylate, trifluoromethyl acrylate, trifluoroethyl acrylate; esters of a secondary alcohol and acrylic acid, such as isopropyl acrylate, cyclohexyl acrylate and isobornyl acrylate; and esters of a tertiary alcohol and acrylic acid, such as tert-butyl acrylate. In the case that any one of esters of a primary alcohol and methacrylic acid or acrylic acid is used out of the above-mentioned (meth)acrylic esters, advantages of the present invention are in particular remarkably exhibited.

If necessary, as raw material or raw materials, one or more of other anionic polymerizable monomers may be used together with the (meth) acrylic ester in the present invention. Examples of the anionic polymerizable monomer that can be optionally used include methacrylic or acrylic monomers such as trimethylsilyl methacrylate, N-isopropylmethacrylamide, N-tert-butylmethacrylamide, trimethylsilyl acrylate, N-isopropylacrylamide, and N-tert-butylacrylamide. Moreover, there may be used a multifunctional anionic polymerizable monomer having in the molecule thereof two or more methacrylic or acrylic structures, such as methacrylic ester structures or acrylic ester structures (for example, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, trimethylolpropane triacrylate and trimethylolpropane trimethacrylate).

In the polymerization processes (X) and (Y) according to the present invention, only one of the monomers, for example, the (meth)acrylic ester may be used, or two or more thereof may be used in combination. When two or more of the monomers may be used in combination, any copolymerization form selected from random, block, tapered block and the like copolymerization forms may be effected by selecting conditions such as a combination of the monomers and the timing of adding the monomers to the polymerization system (for example, simultaneous addition of two or more monomers, or separate additions at intervals of a given time). The polymerization processes (X) and (Y) of the present invention are polymerization processes superior in initiation efficiency and living polymerization property. Therefore, these processes exhibit particularly remarkable effects on block copolymerization.

First, the polymerization process (X) according to the present invention will be described.

In the polymerization process (X) according to the present invention, it is important to polymerize a (meth)acrylic ester (A) in the presence of a tertiary organoaluminum compound having in the molecule thereof a chemical structure represented by the formula: Al—O—Ar wherein Ar represents an aromatic ring, (B) using a polymerization initiator compound comprising a product of an addition reaction of a conjugated diene compound and an organic alkali metal compound. When both of the above-mentioned requirements (A) and (B) are satisfied, the scopes of the (meth)acrylic ester, the organic alkali metal compound and a solvent media for polymerization that can be used become wide and cooling conditions upon the polymerization can be made mild. Moreover, polymerization results (initiation efficiency and living polymerization property) can be made good. The polymerization initiator compound used in the polymerization process (X) of the present invention is a product obtained by addition reaction of a conjugated diene compound with an organic alkali metal compound. Examples of the conjugated diene compound include 1,3-butadiene, isoprene, myrcene, 2-methyl-1,3-pentadiene and cyclohexadiene. Among these compounds, 1,3-butadiene or isoprene is preferred and 1,3-butadiene is particularly preferred in the view of good initiation efficiency.

As the organic alkali metal compound used in the polymerization process (X) according to the present invention, there may be used any alkali metal salt of an organic compound that can be nucleophilically added to the conjugated diene compound. As the alkali metal atom which the organic alkali metal compound has, lithium, potassium or sodium is preferred. Lithium is particularly preferred. Examples of the organic group corresponding to the moiety where one ore more alkali metal atoms are removed from the organic alkali metal compound include monovalent or polyvalent saturated hydrocarbon groups, such as n-butyl, sec-butyl and tert-butyl; and monovalent or polyvalent aromatic hydrocarbon groups, such as diphenylmethyl, 1,1-diphenyl-3-methylpentyl, 1,1-diphenylhexyl, triphenylmethyl and fluorenyl. This organic group may be a group in the form of a polymer (in the specification, the word "polymer" includes the conception of an "oligomer".). Therefore, the molecular weight thereof extends over a wide range and is not necessarily limited. In general, the molecular weight thereof ranges from 15 to 5,000,000. Typical examples of the monofunctional organic alkali metal compound among the organic alkali metal compounds include low molecular weight organic monolithium compounds having as an anionic center a primary carbon atom, such as n-butyllithium; low molecular weight organic monolithium compounds having as an anionic center a secondary carbon atom, such as sec-butyllithium, diphenylmethyllithium and fluorenyllithium; low molecular weight organic monolithium compounds having as an anionic center a tertiary carbon atom, such as tert-butyllithium, 1,1-diphenyl-3-methylpentyllithium, 1,1-diphenylhexyllithium, triphenylmethyllithium; monolithium salts of a polymer having a chemical structure wherein a lithium atom is bonded to only one terminal of its molecular chain, such as polystyryllithium and poly-α-methylstyryllithium. Typical examples of the multifunctional organic alkali metal compound having in the molecule thereof two or more alkali metal atoms among the organic alkali metal compounds include organic dilithium compounds, such as tetra α-methylstyrenedilithium, 1,3-bis(1-lithio-1,3-dimethylpentyl)benzene, 1,3-bis(1-lithio-1-phenyl-3-methylpentyl)benzene; lithium salts of a polymer having a chemical structure wherein lithium atoms are bonded to two or more terminals of its molecular chain, such as organic multilithium compounds obtained by reacting a low molecular weight organic monolithium compound with divinylbenzene (for example, a compound obtained by reacting sec-butyllithium as the low molecular weight organic monolithium compound with divinylbenzene in an amount of 0.5 mole or more of the latter per mole of the former); and multilithium salts of a polymer having a chemical structure wherein each lithium atom is bonded in a pendant form to each of plural sites in the middle of its main chain, such as multilithium salts of a polymer obtained by reacting a polymer having in the molecule thereof two or more double bonds (for example, a conjugated diene polymer) with a low molecular weight organic monolithium compound (for example, sec-butyllithium) in an amount of 2 or more moles of the latter per mole of the former in the presence of a Lewis base (for example, N,N,N',N'-tetramethylethylenediamine).

Among the above-mentioned low molecular weight organic monolithium compounds, the low molecular-weight organic monolithium compounds having as an anionic center a secondary carbon atom or a primary carbon atom are preferred and sec-butyllithium and n-butyllithium are particularly preferred in view of high safety, good handling performance and high initiation efficiency.

As the lithium salt of a polymer having a chemical structure wherein a lithium atom or lithium atoms are bonded to one or more terminals of its molecular chain, such as the lithium salt of a polymer having a chemical structure wherein a lithium atom is bonded to only one terminal of its molecular chain or the lithium salt of a polymer having a chemical structure wherein lithium atoms are bonded to two or more terminals of its molecular chain, there may be used a so-called living polymer produced by anionic polymerization of an anionic polymerizable monomer, using a low molecular weight organolithium compound as a polymerization initiator compound. In the case that the organolithium compound used as the polymerization initiator compound is monofunctional, the resultant living polymer is basically a monolithium salt of a linear polymer. In the case that the organolithium compound is multifunctional (bi- or more-functional), the resultant living polymer is basically a dilithium or multilithium salt of a linear or star-shaped polymer. The anionic polymerizable monomer used to produce such a living polymer is not necessarily limited. Preferred are nonpolar or slightly polar anionic polymerizable monomers, for example, aromatic vinyl compounds such as styrene, α-methylstyrene, p-methylstyrene and m-methylstyrene.

In the case that as the precursor (organic alkali metal compound) for preparing the polymerization initiator compound for polymerizing a (meth)acrylic ester, there is used the above-mentioned lithium salt of a polymer having a chemical structure wherein a lithium atom or lithium atoms are bonded to one or more terminals of its molecular chain, the polymer obtained through subsequent addition of a conjugated diene compound and polymerization of the (meth)acrylic ester is a block copolymer. In the case that, as the precursor, there is used the above-mentioned multilithium salt of a polymer having a chemical structure wherein each lithium atom is bonded in a pendant form to each of plural sites in its main chain, the polymer obtained through subsequent addition of a conjugated diene compound and polymerization of the (meth)acrylic ester is a graft copolymer.

The polymerization initiator compound used in the polymerization process (X) of a (meth)acrylic ester according to the present invention is prepared by subjecting the above-mentioned conjugated diene compound to addition reaction with the above-mentioned organic alkali metal compound. The anionic center of the product resulting from such addition reaction is a carbon atom originating from the conjugated diene compound. In the present invention, as the polymerization initiator compound for polymerizing a (meth)acrylic ester, the organic alkali metal compound is not used as it is but the organic alkali compound is converted to a product resulting from the addition reaction thereof with the conjugated diene compound and then the product is used. By such use as well as addition of a tertiary organoaluminum compound having in the molecule thereof a chemical structure represented by the formula: Al—O—Ar wherein Ar represents an aromatic ring to the polymerization system, the following advantages of the present invention can be attained: enlargement of the scope of the (meth)acrylic ester, the organic alkali metal compound and the solvent media for polymerization that can be used; making cooling conditions mild upon the polymerization; and an improvement in polymerization results (initiation efficiency and living polymerization property).

In the polymerization process (X) according to the present invention, reaction conditions at the time of the addition reaction of a conjugated diene compound with an organic alkali metal compound are not necessarily limited. In general, however, the conjugated diene compound is used in an amount of 1 mole or more per mole of the alkali metal atom (or anionic center) of the organic alkali metal compound. In order to make addition of the anionic center of the organic alkali metal compound to the conjugated diene compound more complete, the conjugated diene compound is preferably used in an amount of 2 moles or more per mole of the alkali metal atom (or anionic center) of the organic alkali metal compound. The upper limit of the use ratio of the conjugated diene compound to the organic alkali metal compound is not limited in order to attain the advantages of the present invention. However, as the use ratio of the conjugated diene compound to the organic alkali metal compound becomes larger, the chain of a poly(conjugated diene compound) resulting from the anionic polymerization of the conjugated diene compound becomes longer. Therefore, this ratio is preferably set to an appropriate value, considering the chemical structure of a target polymer. That is, in order to obtain a block copolymer or a graft copolymer comprising a polymer fragment comprising the conjugated diene compound and a polymer fragment comprising the (meth)acrylic ester, the ratio of the conjugated diene compound to the organic alkali metal compound is preferably set, considering the polymerization degree of the conjugated diene compound in the target copolymer, and the like. If it is not desired to introduce any polymer fragment comprising the conjugated diene compound into a final target polymer, it is preferred to adopt such a condition that the use ratio of the conjugated diene compound to the organic alkali metal compound is not raised very much (for example, a condition of 50 moles or less per mole of the alkali metal atom (or anionic center) of the organic alkali metal compound).

The reaction of a conjugated diene compound with an organic alkali metal compound is not necessarily limited. Preferably, the reaction is conducted in an organic solvent. The organic solvent is not necessarily limited. The following are preferably used since safety upon handling is relatively high and they can also be used as an organic solvent upon the subsequent polymerization of a (meth)acrylic ester: aromatic hydrocarbon solvents such as benzene, toluene, ethylbenzene and xylene; saturated hydrocarbon solvents such as hexane, cyclohexane and methylcyclohexane; halogenated hydrocarbon solvents such as chloroform, methylene chloride and carbon tetrachloride; ester solvents such as dimethyl phthalate; and the like. These organic solvents may be used alone or in combination of two or more. In the case that the organic solvent is used, the amount thereof may be appropriately adjusted dependently on the kind of the used organic alkali metal compound, the molecular weight of a target polymerization initiator compound, the kind of the organic solvent, and the like. In general, from the standpoint of smooth advance of the reaction, the organic solvent is preferably used in an amount of 200 to 3000 parts by weight per 100 parts by weight of the total of the organic alkali metal compound and the conjugated diene compound.

In the reaction of a conjugated diene compound with an organic alkali metal compound in the polymerization process (X) according to the present invention, it is desired that incorporation of water content into the reaction system is avoided as much as possible. Therefore, it is preferred to use, as chemical substances that are supplied to the system, such as the conjugated diene compound and any other chemical substance (for example, an organic solvent), substances that contains water content as less as possible. If necessary, therefore, they may be subjected to deaeration or dehydration treatment. The reaction is preferably conducted under the atmosphere of an inert gas such as nitrogen, argon or helium.

Furthermore, in order to make reaction conditions in the reaction system uniform, for example, the addition reaction is conducted with vigorous stirring.

In the reaction of an organic alkali metal compound with a conjugated diene compound in the polymerization process (X) according to the present invention, the temperature in the reaction system is not limited. An appropriate temperature may be selected and adopted dependently on the kind of the organic alkali metal compound, the kind of the conjugated diene compound, and the like. In many cases, however, it is preferred to adopt a temperature within the range of $-20$ to $100°$ C. This reaction may be allowed to continue until the addition of the conjugated diene compound completes while the situation of the advance of the reaction is checked by a change in color originating from the anions in the reaction system or quantitative analysis of a sample collected from the reaction system by an analysis method such as gas chromatography or a nuclear magnetic resonance absorption spectrum (NMR). Usually, the time necessary for the reaction is within the range of 1 minute to 24 hours.

In the polymerization process (X) according to the present invention, a tertiary organoaluminum compound having in the molecule thereof a chemical structure represented by the formula: Al—O—Ar wherein Ar represents an aromatic ring (which may be referred to as an "organoaluminum compound (I)" hereinafter) is caused to be present in the polymerization system at least in the step of polymerizing a (meth)acrylic ester. By selecting and using the organoaluminum compound (I) as an organoaluminum compound which is caused to be present in the system for polymerizing the (meth)acrylic ester as well as the use of the polymerization initiator compound comprising an addition reaction product of the organic alkali metal compound and the conjugated diene compound, the following advantages of the present invention can be attained in the polymerization process (X) according to the present invention: enlargement of the scope of the (meth)acrylic ester, the organic alkali metal compound and the solvent media for polymerization that can be used; making cooling conditions mild upon the polymerization; and an improvement in polymerization results (initiation efficiency and living polymerization property).

The organoaluminum compound (I) is roughly classified into the following three kinds: an organoaluminum compound having a chemical structure wherein only one out of three bonds that an aluminum atom has is connected to an aromatic ring through an oxygen atom (which may be referred to as an organoaluminum compound (I-1) hereinafter); an organoaluminum compound having a chemical structure wherein two out of three bonds that an aluminum atom has are connected to an aromatic ring through an oxygen atom (which may be referred to as an organoaluminum compound (I-2) hereinafter); and an organoaluminum compound having a chemical structure wherein three out of three bonds that an aluminum atom has are connected to an aromatic ring through an oxygen atom (which may be referred to as an organoaluminum compound (I-3) hereinafter).

A typical chemical structure of the organoaluminum compound (I-2) or (I-3) is represented by the following general formula (A):

$$AlR^1R^2R^3 \quad (A)$$

wherein $R^1$ represents a monovalent saturated hydrocarbon group which may have a substituent, a monovalent aromatic hydrocarbon group which may have a substituent, an alkoxyl group which may have a substituent, an aryloxy group which may have a substituent, or N,N-disubstituted amino group; and $R^2$ and $R^3$ each independently represents an aryloxy group which may have a substituent, or $R^2$ and $R^3$ may be bonded to each other to form an arylenedioxy group which may have a substituent.

A typical chemical structure of the organoaluminum compound (I-1) is represented by the following general formula (B):

$$AlR^4R^5R^6 \quad (B)$$

wherein $R^4$ represents an aryloxy group which may have a substituent; and $R^5$ and $R^6$ each independently represents a monovalent saturated hydrocarbon group which may have a substituent, a monovalent aromatic hydrocarbon group which may have a substituent, an alkoxyl group which may have a substituent, or N,N-disubstituted amino group.

As the organoaluminum compound (I), a preferred compound is appropriately selected and used, dependently on the kinds of the monomers, for example, the (meth)acrylic ester to be used, and the like. The above-mentioned organoaluminum compound (I-2) or (I-3) is more preferred in view of high polymerization rate, high initiation efficiency, high living polymerization property, a mild cooling condition upon the polymerization, and the like.

Examples of the aryloxy group that may have a substituent, which can be represented by $R^1$, $R^2$, $R^3$ or R4 in the general formulae (A) and (B), include aryloxy groups having no substituent, such as phenoxy, 2-methylphenoxy, 4-methylphenoxy, 2,6-dimethylphenoxy, 2,4-di-tert-butylphenoxy, 2,6-di-tert-butylphenoxy, 2,6-di-tert-butyl-4-methylphenoxy, 2,6-di-tert-butyl-4-ethylphenoxy, 2,6-diphenylphenoxy, 1-naphthoxy, 2-naphthoxy, 9-phenanthryloxy and 1-pyrenyloxy groups; and aryloxy groups having a substitutent, such as a 7-methoxy-2-naphthoxy group. Among the aryloxy groups that may have a substituent, preferred are substituted phenoxy groups wherein alkyl groups are bonded to 2- and 6-positions thereof (for example, 2,6-dimethylphenoxy, 2,6-di-tert-butylphenoxy, 2,6-di-tert-butyl-4-methylphenoxy, and 2,6-di-tert-butyl-4-ethylphenoxy groups). More preferred are phenoxy groups wherein branched alkyl groups are bonded to 2- and 6-positions thereof (so-called hindered phenoxy groups, for example, 2,6-di-tert-butylphenoxy, 2,6-di-tert-butyl-4-methylphenoxy, and 2,6-di-tert-butyl-4-ethylphenoxy groups).

Examples of the arylenedioxy group that may have a substituent, which can be formed by bonding $R^2$ and $R^3$ to each other in the general formula (A), include groups wherein hydrogen atoms of two phenolic hydroxyl groups are removed from 2,2'-biphenol, 2,2'-methylenebisphenol, 2,2'-methylenebis(4-methyl-6-tert-butylphenol), (R)-(+)-1,1'-bi-2-naphthol, (S)-(–)-1,1'-bi-2-naphthol or the like.

Concerning the aryloxy group which may have a substituent or the arylenedioxy group which may have a substituent, this substituent may be at least one substituent. In this case, examples of the substituent include alkoxy groups such as a methoxy group, an ethoxy group, an isopropoxy group and a tert-butoxy group, and halogen atoms such as chlorine and bromine.

Examples of the monovalent saturated hydrocarbon group that may have a substituent, which can be each independently represented by $R^1$, $R^5$ and $R^6$ in the general formulae (A) and (B), include alkyl groups such as methyl, ethyl, n-propyl, isopropyl, n-butyl, isobutyl, sec-butyl, tert-butyl, 2-methylbutyl, 3-methylbutyl, n-octyl, and 2-ethylhexyl groups; and cycloalkyl groups such as a cyclohexyl group. Examples of the monovalent aromatic hydrocarbon group that may have a substituent, which can be each independently represented by $R^1$, $R^5$ and $R^6$, include aryl groups such as a phenyl group; and aralkyl groups such as a benzyl group. Examples of the alkoxy group that may have a substituent, which can be each independently represented by $R^1$, $R^5$ and $R^6$, include methoxy, ethoxy, isopropoxy, and tert-butoxy groups. Examples of the N,N-disubstituted amino group, which can be each independently represented by $R^1$, $R^5$ and $R^6$, include dialkylamino groups such as dimethylamino, diethylamino and diisopropylamino groups; and a bis(trimethylsilyl)amino group. Examples of the substituent which each of the monovalent saturated hydrocarbon group, the monovalent aromatic hydrocarbon group, the alkoxy group and the N,N-disubstituted amino group may have include alkoxy groups such as methoxy, ethoxy, isopropoxy and tert-butoxy groups; and halogen atoms such as chlorine and bromine.

$R^1$, $R^2$ and $R^3$ in the general formula (A) may have the same chemical structure or different chemical structures if they are within the above-defined scope. In the same way, $R^5$ and $R^6$ in the general formula (B) may have the same chemical structure or different chemical structures if they are within the above-defined scope.

Typical examples of the organoaluminum compound represented by the general formula (A) include ethylbis(2,6-di-tert-butyl-4-methylphenoxy)aluminum, ethylbis(2,6-di-tert-butylphenoxy)aluminum, ethyl[2,2'-methylenebis(4-methyl-6-tert-butylphenoxy)]aluminum, isobutylbis(2,6-di-tert-butyl-4-methylphenoxy)aluminum, isobutylbis(2,6-di-tert-butylphenoxy)aluminum, isobutyl[2,2'-methylenebis(4-methyl-6-tert-butylphenoxy)]aluminum, n-octylbis(2,6-di-tert-butyl-4-methylphenoxy)aluminum, n-octylbis(2,6-di-tert-butylphenoxy)aluminum, n-octyl[2,2'-methylenebis(4-methyl-6-tert-butylphenoxy)]aluminum, methoxybis(2,6-di-tert-butyl-4-methylphenoxy)aluminum, methoxybis(2,6-di-tert-butylphenoxy)aluminum, methoxy[2,2'-methylenebis (4-methyl-6-tert-butylphenoxy)]aluminum, ethoxybis(2,6-di-tert-butyl-4-methylphenoxy)aluminum, ethoxybis(2,6-di-tert-butylphenoxy)aluminum, ethoxy[2,2'-methylenebis(4-methyl-6-tert-butylphenoxy)]aluminum, isopropoxybis(2,6-di-tert-butyl-4-methylphenoxy)aluminum, isopropoxybis(2,6-di-tert-butylphenoxy)aluminum, isopropoxy[2,2'-methylenebis(4-methyl-6-tert-butylphenoxy)]aluminum, tert-butoxybis(2,6-di-tert-butyl-4-methylphenoxy)aluminum, tert-butoxy(2,6-di-tert-butylphenoxy)aluminum, tert-butoxy[2,2'-methylenebis(4-methyl-6-tert-butylphenoxy)]aluminum, tris(2,6-di-tert-butyl-4-methylphenoxy)aluminum, and tris(2,6-diphenylphenoxy)aluminum. Among these organoaluminum compounds represented by the general formula (A), isobutylbis(2,6-di-tert-butyl-4-methylphenoxy)aluminum, isobutylbis(2,6-di-tert-butylphenoxy)aluminum, isobutyl[2,2'-methylenebis(4-methyl-6-tert-butylphenoxy)]aluminum and the like are especially preferred from the viewpoints of high polymerization initiation efficiency, high living polymerization property, easiness of acquisition and handling, and the like.

Typical examples of the organoaluminum compound represented by the general formula (B) include diethyl(2,6-di-tert-butyl-4-methylphenoxy)aluminum, diethyl(2,6-di-tert-butylphenoxy)aluminum, diisobutyl(2,6-di-tert-butyl-4-methylphenoxy)aluminum, diisobutyl(2,6-di-tert-butylphenoxy)aluminum, di-n-octyl(2,6-di-tert-butyl-4-methylphenoxy)aluminum, and di-n-octyl(2,6-di-tert-butylphenoxy)aluminum.

The process for producing the organoaluminum compound (I) is not especially limited. The compound (I) can be produced, for example, according to any known process.

In the polymerization process (X) according to the present invention, only one of the organoaluminum compounds (I) may be used, or two or more. thereof may be used in combination.

The amount of the organoaluminum compound (I) in the polymerization process (X) according to the present invention may be appropriately selected dependently on the kind of polymerization operation, the kind of a solvent constituting a polymerization system when solution polymerization is performed, other various polymerization conditions, and the like. In general, the organoaluminum compound (I) is used in an amount of preferably 1 mole or more and more preferably 2 to 100 moles per mole of the alkali metal atom (or anionic center) of the used polymerization initiator compound. In the case that the organic alkali metal compound and the conjugated diene compound are used to prepare a polymerization initiator compound and then the substantially total amount of the polymerization initiator compound is used to polymerize a (meth)acrylic ester, the mole number of the alkali metal atom (or anionic center) of the used organic alkali metal compound is substantially the same as the mole number of the alkali metal atom (or anionic center) of the prepared polymerization initiator compound. Therefore, the organoaluminum compound (I) is used in an amount of preferably 1 mole or more and more preferably 2 to 100 moles per mole of the alkali metal atom (or anionic center) of the initially used organic alkali metal compound.

In the polymerization reaction in the polymerization process (X) according to the present invention, the following may be caused to be present in the polymerization system if desired: an ether compound; a tertiary polyamine compound; an inorganic salt such as lithium chloride; a metal alkoxide compound such as lithium methoxyethoxyethoxide or potassium tert-butoxide; or an organic quaternary salt such as tetraethylammonium chloride or tetraethylphosphonium bromide. In the case that the above-mentioned ether compound or the above-mentioned tertiary polyamine compound is caused to be present, it is possible to improve initiation efficiency (or block efficiency) and polymerization rate still more and further improve living polymerization property still more by suppressing inactivation in the polymerization of a (meth)acrylic ester. Thus, this case is preferred.

The above-mentioned ether compound can be appropriately selected from compounds which have in the molecule thereof an ether bond (—O—) and do not comprise any metal component and be used so far as the compounds do not have an adverse effect on polymerization reaction. Preferably, the ether compound is selected from cyclic ether compounds having in the molecule thereof two or more ether bonds and acyclic ether compounds having in the molecule thereof one or more ether bonds from the viewpoints of high effects such as high polymerization initiation efficiency and high living polymerization property upon polymerization. Specific examples of the cyclic ether compound having in the molecule thereof two or more ether bonds include crown ethers such as 12-crown-4, 15-crown-5 and 18-crown-6. Specific examples of the acyclic ether compound having in the molecule thereof one or more ether bonds include acyclic monoether compounds such as dimethyl ether, diethyl ether, diisopropyl ether, dibutyl ether and anisol; acyclic diether compounds such as 1,2-dimethoxyethane, 1,2-diethoxyethane, 1,2-diisopropoxyethane, 1,2-dibutoxyethane, 1,2-diphenoxyethane, 1,2-dimethoxypropane, 1,2-diethoxypropane, 1,2-diisopropoxypropane, 1,2-dibutoxypropane, 1,2-diphenoxypropane, 1,3-dimethoxypropane, 1,3-diethoxypropane, 1,3-diisopropoxypropane, 1,3-dibutoxypropane, 1,3-diphenoxypropane, 1,4-dimethoxybutane, 1,4-diethoxybutane, 1,4-diisopropoxybutane and 1,4-dibutoxybutane, 1,4-diphenoxybutane; acyclic triether compounds such as diethylene glycol dimethyl ether, dipropylene glycol dimethyl ether, dibutylene glycol dimethyl ether, diethylene glycol diethyl ether, dipropylene glycol diethyl ether and dibutylene glycol diethyl ether; dialkyl ethers of polyalkylene glycols such as triethylene glycol dimethyl ether, tripropylene glycol dimethyl ether, tributylene glycol dimethyl ether, triethylene glycol diethyl ether, tripropylene glycol diethyl ether, tributylene glycol diethyl ether, tetraethylene glycol dimethyl ether, tetrapropylene glycol dimethyl ether, tetrabutylene glycol diethyl ether, tetraethylene glycol diethyl ether, tetrapropylene glycol diethyl ether and tetrabutylene glycol diethyl ether. Among the above-mentioned specific examples of the ether compounds, the acyclic ether compounds are preferred, and diethyl ether and 1,2-dimethoxyethane are especially preferred since they have a little adverse effect on the organoaluminum compound (I), they exhibit the effect of improvements in polymerization rate, living polymerization property, initiation efficiency (or block efficiency) and so on especially remarkably and they can easily be obtained.

If the cyclic ether compound having in the molecule thereof one ether bond, for example, tetrahydrofuran or such an epoxy compound as propyleneoxide, is caused to be present in the polymerization system according to the present invention, the ether compound may interact with the organoaluminum compound (I) too strongly or react directly with the polymerization initiator compound or the living polymer that is growing. In such a case, it is generally preferred to avoid the manner that the cyclic ether compound is caused to be present in the polymerization system at least in the polymerization step of a (meth)acrylic ester.

The tertiary polyamine compound can be appropriately selected from compounds having in the molecule thereof two or more tertiary amine structures and be used so far as the compounds do not have an adverse effect on the polymerization reaction. The "tertiary amine structure" in the present invention means a partial chemical structure wherein three carbon atoms are bonded to one nitrogen atom, and may constitute a part of an aromatic ring so far as one nitrogen atom is bonded to three carbon atoms. Preferred specific examples of the tertiary polyamine compound include chain-form polyamine compounds such as N,N,N',N'-tetramethylethylenediamine, N,N,N',N'-tetraethylethylenediamine, N,N,N',N",N"-pentamethyldiethylenetriamine, 1,1,4,7,10,10-hexamethyltriethylenetetraamine and tris[2-(dimethylamino)ethyl])amine; non-aromatic heterocyclic compounds such as 1,3,5-trimethylhexahydro-1,3,5-triazine, 1,4,7-trimethyl-1,4,7-triazacyclononane, and 1,4,7,10,13,16-hexamethyl-1,4,7,10,13,16-hexaazacyclooctadecane: and aromatic heterocyclic compounds such as 2,2'-bipyridyl and 2,2':6',2"-terpyridine. In the case that a tertiary monoamine compound such as triethylamine is caused to be present in the polymerization system at least in the polymerization step of a (meth)acrylic ester, advantages are hardly produced or only small advantages are produced.

Any compound having in the molecule thereof one or more ether bonds and one tertiary amine structure can be regarded as the above-mentioned ether compound. Any compound having in the molecule thereof one or more ether bonds and two or one tertiary amine structures can be regarded as either the above-mentioned ether compound or the above-mentioned tertiary polyamine compound. Therefore, any compound having in the molecule thereof one or more ether bonds and one or more tertiary amine structures can be used as the ether compound or tertiary polyamine compound.

In the case that the above-mentioned ether compound or tertiary polyamine compound is used, the amount thereof is not necessarily limited. In order to exhibit sufficiently the above-mentioned advantages based on the addition thereof, the total mole number of the used ether compound and the tertiary polyamine compound is preferably 0.1 time or more, more preferably 0.3 time or more, and still more preferably 0.5 time or more the mole number of the alkali metal atom or anionic center of the used polymerization initiator compound or a precursor thereof (for example, an organic alkali metal compound). The upper limit of the amount of the ether compound and the tertiary polyamine compound is not necessarily limited. However, if the amount thereof is too large, initiation efficiency trends to drop. Therefore, in order that the initiation efficiency does not drop very much, it is generally preferred to set the total amount of the ether compound and the tertiary polyamine compound to about 95% or less by weight of the polymerization system.

In the polymerization reaction in the polymerization process (X) according to the present invention, any polymerization manner, for example, solution polymerization, bulk polymerization or precipitation polymerization, can be adopted. Since the temperature of the polymerization can be controlled and conditions can be made uniform in the polymerization system to advance the polymerization smoothly, it is preferred to adopt solution polymerization in an organic solvent. The kind of the organic solvent is not necessarily limited. There is preferably used an aromatic hydrocarbon solvent such as benzene, toluene, ethylbenzene or xylene; a saturated hydrocarbon solvent such as hexane, cyclohexane, or methylcyclohexane; a halogenated hydrocarbon solvent such as chloroform, methylene chloride or carbon tetrachloride; an ester solvent such as dimethyl phthalate; or the like in view of relatively high safety on handling thereof, less incorporation into waste liquid, and easy recovery and purification thereof. These organic solvents may be used alone or in combination of two or more.

In the case that the organic solvent is used, the amount thereof may be appropriately adjusted, dependently on the polymerization degree of a target polymer, the kinds of the monomers, for example, the (meth)acrylic ester, the kind of the polymerization initiator compound, the kind of the organoaluminum compound (I), the kind of the organic solvent, and the like. In general, the organic solvent is used in an amount of 200 to 3000 parts by weight per 100 parts by weight of the total of the polymerization initiator compound and the monomers.

In the polymerization reaction in the polymerization process (X) according to the present invention, it is desired that incorporation of water content into the polymerization system is avoided as much as possible. Therefore, it is preferred that, as chemical substances that are supplied to the system, such as the monomers, the organoaluminum compound (I), any other chemical substance (for example, the organic solvent, the ether compound, the tertiary polyamine compound and the like), substances that contains water content as less as possible are used. If necessary, therefore, they may be subjected to deaeration or dehydration treatment. The polymerization reaction is preferably conducted under the atmosphere of an inert gas such as nitrogen, argon or helium.

Furthermore, in order to make reaction conditions in the polymerization reaction system uniform, for example, the polymerization is conducted with vigorous stirring.

In general, the polymerization process (X) according to the present invention comprises an operation of addition reaction of a conjugated diene compound with an organic alkali metal compound to prepare a polymerization initiator compound, and an operation of polymerization of the (meth) acrylic ester with the polymerization initiator compound.

The manner of the polymerization reaction in the, polymerization process (X) according to the present invention is not necessarily limited. Conveniently, a conjugated diene compound is reacted with an organic alkali metal compound to prepare a polymerization initiator compound, and next a (meth)acrylic ester is added to this system. The timing of adding an organoaluminum compound (I) at this time is not necessarily limited so far as the organoaluminum compound (I) can be present in the polymerization system of the (meth)acrylic ester. An appropriate method can be adopted from the following various methods: a method comprising adding the total amount of an organoaluminum compound (I) to the system containing a polymerization initiator compound before addition of a (meth)acrylic ester; a method comprising mixing the total amount of an organoaluminum compound (I) with a (meth)acrylic ester so as to add the organoaluminum compound (I) together with the (meth)acrylic ester to the system containing a polymerization initiator compound; a method comprising mixing a part of an organoaluminum compound (I) with a (meth)acrylic ester and then adding the remainder of the organoaluminum compound (I) to the system containing a polymerization initiator compound so as to add the part of the organoaluminum compound (I) together with the (meth)acrylic ester to the system containing the polymerization initiator compound and the remainder of the organoaluminum compound (I); and the like. Among the above-mentioned methods of adding an organoaluminum compound (I), the method comprising mixing at least one part of an organoaluminum compound (I) with a (meth)acrylic ester and then adding the resultant mixture to the polymerization system is preferred since advantages as follows can be produced: a side reaction based on coordination of the organoaluminum compound (I) to the (meth)acrylic ester is suppressed; and inactivation of the polymerization initiator compound based on a reaction of the organoaluminum compound (I) with an impurity in the (meth)acrylic ester is suppressed.

When an organoaluminum compound (I) is brought into contact with a polymerization initiator compound, in order to raise initiation efficiency of the polymerization initiator compound, the temperature in the reaction system is preferably controlled to 40° C. or lower and is more preferably controlled to 25° C. or lower.

In the case that polymerization reaction of a (meth)acrylic ester is conducted in the presence of an ether compound or a tertiary polyamine compound, the timing of adding the ether compound or the tertiary polyamine compound is not necessarily limited. Preferably, there is used such a manner that the ether compound or the tertiary polyamine compound can be brought into contact with an organoaluminum compound (I) before being brought into contact with a polymerization initiator compound.

The following will describe the polymerization process (Y) according to the present invention.

In the polymerization process (Y) according to the present invention, it is important to polymerize a (meth)acrylic ester,
(C) using a polymerization initiator compound comprising a product of an addition reaction of a compound having a 1,1-diaryl-1-alkene structure (which may be hereinafter referred to as a "diarylalkene type compound") and an organic alkali metal compound,
(D) by adding, to the polymerization system, the (meth) acrylic ester in the form of a mixture with a tertiary organoaluminum compound having in the molecule thereof a chemical structure represented by the formula: Al—O—Ar wherein Ar represents an aromatic ring (an organoaluminum compound (I)).

When the above-mentioned requirements (C) and (D) are satisfied, the scopes of the (meth)acrylic ester, the organic alkali metal compound and a solvent media for polymerization that can be used become wide and cooling conditions upon the polymerization can be made mild. Moreover, polymerization results (initiation efficiency and living polymerization property) can be made good. The polymerization initiator compound used in the polymerization process (Y) of the present invention is a product obtained by addition reaction of a diarylalkene type compound with an organic alkali metal compound. This diarylalkene type compound is a compound having, as a part of the molecule thereof, a chemical structure represented by the following formula:

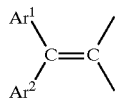

wherein Ar1 and Ar2 each independently represents an aromatic ring. Examples of the diarylalkene type compound include 1,1-diaryl-1-alkene such as 1,1-diphenylethylene, 1,1-bis(4-methylphenyl)ethylene, and 1,1-diphenylpropene; and bis(1-aryl-1-alkenyl)arene such as 1,3-bis(1-phenylethenyl)benzene. Among these compounds, particualrly preferred are 1,1-diphenylethylene and 1,3-bis(1-phenylethenyl)benzene in view of superior initiation efficiency.

As the organic alkali metal compound, there may be used any one of alkali metal salts of an organic compound that can be nucleophilically added to the diarylalkene type compound. As the alkali metal atom which the organic alkali metal compound has, lithium, potassium or sodium is preferred. Lithium is particularly preferred. Examples of the organic group corresponding to the moiety that one ore more alkali metal atoms are removed from the organic alkali metal compound include monovalent or polyvalent saturated hydrocarbon groups, such as n-butyl, sec-butyl and tert-butyl; and monovalent or polyvalent aromatic hydrocarbon groups, such as benzyl, methylbenzyl and 1-phenyl-1-methylethyl. The organic group may be a group in the form of a polymer (in the specification, the word "polymer" includes the conception of an "oligomer".). Therefore, the molecular weight thereof extends over a wide range and is not necessarily limited. In general, the molecular weight thereof ranges from 15 to 5,000,000. Typical examples of the monofunctional organic alkali metal compound among the organic alkali metal compounds include low molecular weight organic monolithium compounds having as an anionic center a primary carbon atom, such as n-butyllithium or benzyllithium; low molecular weight organic monolithium compounds having as an anionic center a secondary carbon atom, such as sec-butyllithium and α-methyllithium; low molecular weight organic monolithium compounds having as an anionic center a tertiary carbon atom, such as tert-butyllithium and 1-phenyl-1-methylethyllithium; monolithium salts of a polymer having a chemical structure wherein a lithium atom is bonded to only one terminal of its molecular chain, such as polystyryllithium, poly-α-methylstyryllithium, polybutadienyllithium and polyisoprenyllithium. In the case that such a monolithium salt is reacted in a sufficient amount with such a 1,1-diaryl-1-alkene as above, the resultant polymerization initiator is monofunctional. In the case that such a monolithium salt is reacted in a sufficient amount with such a bis(1-aryl-1-alkenyl)arene as above, the resultant polymerization initiator is bifunctional. Typical examples of the multifunctional organic alkali metal compound having in the molecule thereof two or more alkali metal atoms among the organic alkali metal compounds include organic dilithium compounds, such as tetra α-methylstyrenedilithium, and 1,3-bis(1-lithio-1,3-dimethylpentyl)benzene; lithium salts of a polymer having a chemical structure wherein lithium atoms are bonded to two or more terminals of its molecular chain, such as organic multilithium compounds obtained by reacting a low molecular weight organic monolithium compound with divinylbenzene (for example, a compound obtained by reacting sec-butyllithium as the low molecular weight organic monolithium compound with divinylbenzene in an amount of 0.5 mole or more of the latter per mole of the former); and multilithium salts of a polymer having a chemical structure wherein each lithium atom is bonded in a pendant form to each of plural sites in its main chain, such as multilithium salts of a polymer obtained by reacting a polymer having in the molecule thereof two or more double bonds (for example, a conjugated diene polymer) with a low molecular weight organic monolithium compound (for example, sec-butyllithium) in an amount of 2 or more moles of the latter per mole of the former in the presence of a Lewis base (for example, N,N,N',N'-tetramethylethylenediamine).

Among the above-mentioned low molecular weight organic monolithium compounds, the low molecular weight organic monolithium compounds having as an anionic center a secondary carbon atom or a primary carbon atom are preferred and sec-butyllithium and n-butyllithium are particularly preferred in view of high safety, good handling performance and high initiation efficiency.

As the lithium salt of a polymer having a chemical structure wherein a lithium atom or lithium atoms are bonded to one or more terminals of its molecular chain, such as the lithium salt of a polymer having a chemical structure wherein a lithium atom is bonded to only one terminal of its molecular chain or the lithium salt of a polymer having a chemical structure wherein lithium atoms are bonded to two or more terminals of its molecular chain, there may be used a so-called living polymer produced by anionic polymerization of an anionic polymerizable monomer, using a low molecular weight organolithium compound as a polymerization initiator compound. In the case that the organolithium compound used as the polymerization initiator compound is monofunctional, the resultant living polymer is basically a monolithium salt of a linear polymer. In the case that the organolithium compound is multifunctional (bi- or more-functional), the resultant living polymer is basically a dilithium or multilithium salt of a linear or star-shaped polymer. The anionic polymerizable monomer used to produce such a living polymer is not necessarily limited. Preferred are nonpolar or slightly polar anionic polymerizable monomers, for example, aromatic vinyl compounds (from which diarylalkene type compounds are removed), such as styrene, α-methylstyrene, p-methylstyrene, m-methylstyrene; and conjugated diene compounds, such as 1,3-butadiene, isoprene, myrcene, 2-methyl-1,3-pentadiene and cyclohexadiene.

In the case that as a precursor (organic alkali metal compound) for preparing the polymerization initiator compound for polymerizing a (meth)acrylic ester, there is used the above-mentioned lithium salt of a polymer having a chemical structure wherein a lithium atom or lithium atoms are bonded to one or more terminals of its molecular chain, the polymer obtained through subsequent addition of a diarylalkene type compound and polymerization of the (meth)acrylic ester is a block copolymer. In the case that as the precursor, there is used the above-mentioned multilithium salt of a polymer having a chemical structure wherein each lithium atom is bonded in a pendant form to each of plural sites in the middle of its main chain, the polymer obtained through subsequent addition of a diarylalkene type compound and polymerization of the (meth) acrylic ester is a graft copolymer.

The polymerization initiator compound used in the polymerization process (Y) of a (meth)acrylic ester according to the present invention is prepared by subjecting the above-mentioned diarylalkene type compound to addition reaction with the above-mentioned organic alkali metal compound. The anionic ion center of the product resulting from the addition reaction is a carbon atom originating from the diarylalkene type compound. In polymerization process (Y) according to the present invention, as the polymerization initiator compound for polymerizing a (meth)acrylic ester, the organic alkali metal compound is not used as it is but the organic alkali compound is converted to a product resulting from the addition reaction thereof with the diarylalkene type compound and then the product is used. By such use and addition of the (meth) acrylic ester in the form of a mixture of this ester and the organoaluminum compound (I) to the polymerization system, the following advantages of the present invention can be attained: enlargement of the scope of the (meth)acrylic ester, the organic alkali metal compound and the solvent media for polymerization that can be used; making cooling conditions upon the polymerization mild; and an improvement in polymerization results (initiation efficiency and living polymerization property).

In the polymerization process (Y) according to the present invention, reaction conditions at the time of the addition reaction of a diarylalkene type compound with an organic alkali metal compound are not necessarily limited. In general, however, the diarylalkene type compound is used in an amount of 1 mole or more per mole of the alkali metal atom (or anionic center) of the organic alkali metal compound. In order to make addition of the anionic center of the organic alkali metal compound to the diarylalkene type compound more complete, the diarylalkene type compound is preferably used in an excessive amount over the alkali metal atom (or anionic center) of the organic alkali metal compound. The upper limit of the use ratio of the diarylalkene type compound to the organic alkali metal compound is not limited in order to attain the advantages of the present invention. In general, however, the diarylalkene type compound cannot be polymerized solely. Alternatively, even if it is polymerized, the polymerizability is very low. In general, therefore, an excessive amount of the diarylalkene type compound does not react and remains in the polymerization system. For this reason, considering a drop in productivity on the basis of recovery of the unreacted diarylalkene type compound after the polymerization, the amount of the diarylalkene type compound is preferably 1000 moles or less and more preferably 100 moles or less per mole of the alkali metal atom (or the anionic center) of the organic alkali metal compound.

The reaction of a diarylalkene type compound with an organic alkali metal compound is not necessarily limited. Preferably, the reaction is conducted in an organic solvent. The organic solvent is not necessarily limited. The following are preferably used since safety upon handling is relatively highland they can also be used as an organic solvent upon subsequent polymerization of a (meth) acrylic ester: aromatic hydrocarbon solvents such as benzene, toluene, ethylbenzene and xylene; saturated hydrocarbon solvents such as hexane, cyclohexane and methylcyclohexane; halogenated hydrocarbon solvents such as chloroform, methylene chloride and carbon tetrachloride; ester solvents such as dimethyl phthalate; and the like. These organic solvents may be used alone or in combination of two or more. In the case that the organic solvent is used, the amount thereof may be appropriately adjusted dependently on the kind of the used organic alkali metal compound, the molecular weight of a target polymerization initiator compound, the kind of the organic solvent, and the like. In general, from the standpoint of smooth advance of the reaction, the organic solvent is preferably used in an amount of 200 to 3000 parts by weight per 100 parts by weight of the total of the organic alkali metal compound and the diarylalkene type compound.

In the reaction of a diarylalkene type compound with an organic alkali metal compound in the polymerization process (Y) according to the present invention, it is desired that incorporation of water content into the reaction system is avoided as much as possible. Therefore, it is preferred to use, as chemical substances that are supplied to the system, such as the diarylalkene type compound and any other chemical substance (for example, the organic solvent), substances that contains water content as less as possible. If necessary, therefore, they may be subjected to deaeration or dehydration treatment. The reaction is preferably conducted under the atmosphere of an inert gas such as nitrogen, argon or helium.

Furthermore, in order to make reaction conditions in the reaction system uniform, for example, the addition reaction is conducted with vigorous stirring.

In the reaction of an organic alkali metal compound with a diarylalkene type compound in the polymerization process (Y) according to the present invention, the temperature in the reaction system is not limited. An appropriate temperature may be selected and adopted dependently on the kind of the organic alkali metal compound, the kind of the diarylalkene type compound, and the like. In many cases, however, it is preferred to adopt a temperature within the range of −20 to 100° C. This reaction may be caused to continue until the addition of the diarylalkene type compound completes while the situation of the advance of the reaction is checked by quantitative analysis of a sample collected from the reaction system by an analysis method such as gas chromatography or a nuclear magnetic resonance absorption spectrum (NMR). Usually, the time necessary for the reaction is within the range of 1 minute to 72 hours.

In the case that a (meth)acrylic ester is add to the polymerization system containing the polymerization initiator compound prepared as above and is then polymerized in the polymerization process (Y) according to the present invention, the addition is performed after the (meth)acrylic ester is mixed with an organoaluminum compound (I) to prepare a mixture. By selecting and using the organoaluminum compound (I) as an organoaluminum compound which is caused to be present in the system for polymerizing the (meth)acrylic ester and further the addition of the organoaluminum compound (I) in the form of a mixture with the (meth)acrylic ester to the polymerization system as well as by the use of the polymerization initiator compound comprising an addition reaction product of the organic alkali metal compound and the diarylalkene type compound, the following advantages of the present invention can be attained in the polymerization process (Y) according to the present invention: enlargement of the scope of the (meth) acrylic ester, the organic alkali metal compound and the solvent media for polymerization that can be used; making cooling conditions mild upon the polymerization; and an improvement in polymerization results (initiation efficiency and living polymerization property).

As the organoaluminum compound (I), a preferred compound is appropriately selected and used, dependently on the kinds of the monomers, for example, the (meth)acrylic ester to be used, and the like. The above-mentioned organoaluminum compound (I-2) or (I-3) is more preferred in view of high polymerization rate, high initiation efficiency, high living polymerization property, a mild cooling condition upon the polymerization, and the like. Concerning the organoaluminum compound (I) [including the organoaluminum compounds (I-1), (I-2) and (I-3), which are subordinate concept thereof, and the organoaluminum compounds represented by the general formulae (A) and (B)], the explanation except the above-mentioned points overlaps with the explanation for the polymerization process (X).

The polymerization process (Y) according to the present invention generally comprises an operation of addition reaction of a diarylalkene type compound with an organic alkali metal compound to prepare a polymerization initiator compound, an operation of mixing of a (meth) acrylic ester and an organoaluminum compound (I) to prepare a mixture of the two, and an operation of addition of the mixture to the polymerization system containing the polymerization initiator compound to polymerize the (meth)acrylic ester.

The mixture of the (meth)acrylic ester and the organoaluminum compound (I) can be prepared by mixing the two. It can be presumed that in the polymerization process (Y), the organoaluminum compound (I) is coordinated to the carbonyl group of the (meth)acrylic ester by this mixing so that a side reaction which can be caused when the (meth)acrylic ester is added without accompanying the organoaluminum compound (I) to the polymerization system (nucleophilic attack against the carbonyl group of the (meth)acrylic ester) can be suppressed. From the standpoint of easy exhibition of the advantages of the present invention, the (meth)acrylic ester used to prepare the mixture with the organoaluminum compound (I) preferably corresponds to the substantially total amount of the (meth)acrylic ester to be added to the polymerization system containing the polymerization initiator compound prepared by addition-reaction of the diarylalkene type compound with the organic alkali metal compound. The present invention is not limited to such a case so far as the advantages of the present invention are exhibited. For example, it is allowable that 50% or more by mole of the (meth)acrylic ester to be added to the polymerization system containing a polymerization initiator compound is added in the form of a mixture with the organoaluminum compound (I) to the polymerization system, and the remainder of the (meth)acrylic ester [less than 50% by mole of the (meth) acrylic ester to be added] is added, without being mixed with the organoaluminum compound (I). From the standpoint of easy exhibition of the advantages of the present invention, the amount of the organoaluminum compound (I) used to prepare a mixture with the (meth)acrylic ester is preferably 0.01 mole or more per mole of the (meth)acrylic ester used to prepare the mixture. The upper limit of the range of a preferred amount of the organoaluminum compound (I) used to prepare the mixture with the (meth)acrylic ester is not strictly limited. In general, however, the amount is 300 moles or less per mole of the above-mentioned polymerization initiator compound. The mixing of the (meth)acrylic ester and the organoaluminum compound (I) may be conducted in an organic solvent so far as an adverse effect on subsequent polymerization is not produced. Examples of the organic solvent that can be used include n-hexane, n-heptane, cyclohexane, methylcyclohexane, benzene, toluene, diethyl ether and 1,2-dimethoxyethane. The amount of the organic solvent is not limited and can be selected at will. Usually, the amount is 100 parts or less by weight per part of the organoaluminum compound. It is desired that the mixing of the (meth)acrylic ester and the organoaluminum compound (I) is conducted in the system containing water content as less as possible, in order to avoid incorporation of water content into the system on the subsequent polymerization. Therefore, it is preferred that as chemical substances that are supplied to the system, such as the (meth)acrylic ester, the organoaluminum compound (I) and any other chemical substance (for example, the organic solvent), substances that contains water content as less as possible are used. If necessary, therefore, they may be subjected to deaeration or dehydration treatment. The mixing is preferably conducted under the atmosphere of an inert gas such as nitrogen, argon or helium.

Furthermore, if necessary, stirring may be conducted in the preparation of the mixture of the (meth)acrylic ester and the organoaluminum compound (I) in order that they contact each other sufficiently.

The temperature upon the mixing of the (meth)acrylic ester and the organoaluminum compound (I) in the polymerization process (Y) according to the present invention is not particularly limited. In many cases, a temperature within the range of −50 to 100° C. can be adopted. The time necessary for the mixing is not particularly limited. In normal cases, the time is within the range of 10 seconds to 24 hours since it is sufficient that the (meth)acrylic ester and the organoaluminum compound (I) contact each other.

If the polymerization initiator compound is brought into contact with the organoaluminum compound (I) alone before being brought into contact with the mixture of the organoaluminum compound (I) and the (meth)acrylic ester in the polymerization process (Y) according to the present invention, the polymerization initiator efficiency of the (meth)acrylic ester trends to drop. Therefore, it is preferred to avoid addition of the organoaluminum compound (I) alone to the polymerization system containing the polymerization initiator compound before addition of the mixture of the organoaluminum compound (I) and the (meth)acrylic ester to the polymerization system.

In the polymerization reaction in the polymerization process (Y) according to the present invention, the following additive may be caused to be present in the polymerization system if desired: an ether compound; a tertiary polyamine compound; an inorganic salt such as lithium chloride; a metal alkoxide compound such as lithium methoxyethoxyethoxide or potassium tert-butoxide; or an organic quaternary salt such as tetraethylammonium chloride or tetraethylphosphonium bromide. In the case that the above-mentioned ether compound or the above-mentioned tertiary polyamine compound is caused to be present, it is possible to improve initiation efficiency (or block efficiency) and polymerization rate still more and further improve living polymerization property still more by suppressing inactivation in the polymerization of the (meth)acrylic ester. Thus, this case is preferred. The explanation on the ether compound and the tertiary polyamine compound which can be used in the polymerization process (Y) and conditions for using them overlaps with the above-mentioned explanation for the polymerization process (X).

In the polymerization reaction in the polymerization process (Y) according to the present invention, any polymerization manner, for example, solution polymerization, bulk polymerization or precipitation polymerization, can be adopted. Since the temperature of the polymerization can be controlled and conditions can be made uniform in the polymerization system to advance the polymerization smoothly, it is preferred to adopt solution polymerization in an organic solvent. The organic solvent is not necessarily limited. There is preferably used an aromatic hydrocarbon solvent such as benzene, toluene, ethylbenzene or xylene; a saturated hydrocarbon solvent such as hexane, cyclohexane, or methylcyclohexane; a halogenated hydrocarbon solvent such as chloroform, methylene chloride or carbon tetrachloride; an ester solvent such as dimethyl phthalate; or the like in view of relatively high safety on handling thereof, less incorporation into waste liquid, and easy recovery and purification thereof. These organic solvents may be used alone or in combination of two or more.

In the case that the organic solvent is used, the amount thereof may be appropriately adjusted, dependently on the polymerization degree of a target polymer, the kinds of the monomers, for example, the (meth)acrylic ester, the kind of the polymerization initiator compound, the kind of the organoaluminum compound (I), the kind of the organic solvent, and the like. In general, the organic solvent is used in an amount of 200 to 3000 parts by weight per 100 parts by weight of the total of the polymerization initiator compound and the monomers from the standpoint of smooth advance of the polymerization, easy separation of the resultant polymer and reduction in a burden of disposal of waste fluid.

In the polymerization reaction in the polymerization process (Y) according to the present invention, it is desired that incorporation of water content into the polymerization reaction system is avoided as much as possible. Therefore, it is preferred that as chemical substances that are supplied to the system, such as the monomers, the organoaluminum compound (I) and any other chemical substances (for example, the organic solvent, the ether compound, and the tertiary polyamine compound), substances that contains water content as less as possible are used. If necessary, therefore, they may be subjected to deaeration or dehydration treatment. The polymerization reaction is preferably conducted under the atmosphere of an inert gas such as nitrogen, argon or helium.

Furthermore, in order to make reaction conditions uniform in the polymerization reaction system, for example, the polymerization is preferably conducted with vigorous stirring. In the case that the polymerization reaction of a (meth)acrylic ester is conducted in the presence of the ether compound or the tertiary polyamine compound, the timing of adding this compound is not necessarily limited. It is preferred to adopt such a manner that this compound can contact the organoaluminum compound (I) before contacting a polymerization initiator compound.

The following will describe polymerization reaction common to the polymerization processes (X) and (Y) according to the present invention.

In the polymerization processes (X) and (Y) according to the present invention, the temperature in the polymerization system is not particularly limited. A preferred temperature is appropriately selected and adopted, dependently on the kinds of the monomers, for example, the (meth)acrylic ester to be polymerized, and the like. In many cases, a temperature within the range of −60 to 100° C. is preferably adopted, and a temperature within the range of −50 to 50 ° C. is more preferably adopted. For example, in the case that a methacrylic ester is polymerized, a temperature within the range of −30 to 50° C. is more preferably adopted. In the case that an acrylic ester is polymerized, a temperature within the range of −60 to 50° C. is preferably adopted, and a temperature within the range of −50 to 30° C. is more preferably adopted. The polymerization processes (X) and (Y) according to the present invention can make the condition for cooling the polymerization system milder than conventional anionic polymerization. Even if the polymerization is conducted at a temperature nearer to room temperature, high living polymerization property can be attained.

In the polymerization reaction of a (meth)acrylic ester in the polymerization processes (X) and (Y) according to the present invention, the reaction is appropriately caused to continue by quantitatively analyzing a sample collected from the polymerization reaction system by an analysis method such as gas chromatography, gel permeation chromatography (GPC) or a nuclear magnetic resonance absorption spectrum (NMR) and then checking the situation of the advance of the polymerization. Usually, the time necessary for the reaction is within the range of 1 minute to 24 hours.

In the polymerization processes (X) and (Y) according to the present invention, the rate of the polymerization reaction can be made higher by conducting the polymerization reaction of a (meth)acrylic ester in the presence of the above-mentioned ether compound or tertiary polyamine compound. That is, in the case of a methacrylic ester, the polymerization thereof can be completed within several minutes. In the case of an acrylic ester, the polymerization thereof can be completed within several tens of seconds. Accordingly, in the case that the polymerization reaction according to the present invention is conducted in the presence of the ether compound or tertiary polyamine compound, a "continuous tube reactor polymerization" process, wherein productivity is high and cooling efficiency is good, can be adopted.

In the polymerization processes (X) and (Y) according to the present invention, the polymerization reaction can be terminated by addition of a polymerization terminator, according to known anionic polymerization, at the stage in which a target polymer chain has been produced. As the polymerization terminator, for example, a protic compound such as methanol, acetic acid, or hydrochloric acid in methanol can be used. The amount of the polymerization terminator is not particularly limited. In general, the amount is preferably within the range of 1 to 100 moles per mole of the alkali metal atom (or anionic center) of the polymerization initiator compound.

In the polymerization processes (X) and (Y) according to the present invention, a terminal functional group supplying agent (for example, aldehyde, lactone or carbon dioxide) may be added to the reaction system after complete end of given polymerization and before the addition of the polymerization terminator. In this case, it is possible to obtain a polymer having in the terminal of its molecular chain a functional group such as a hydroxyl group or a carboxyl group. A multifunctional compound having in the molecule thereof two or more functional groups such as a formyl, keto, chlorocarbonyl or halogenated silyl group may also be added to the reaction system after complete end of given polymerization and before the addition of the polymerization terminator. In this case, it is possible to obtain a linear or star-shaped polymer wherein two or more polymers are bonded (coupled) to each other through a residue originating from the multifunctional compound as a center.

If a metal component originating from the used polymerization initiator compound or the used organoaluminum compound (I) remains in the polymer obtained by separation from the reaction mixture after the termination of the polymerization, physical properties of the polymer or a material containing it may drop or transparency thereof may deteriorate. Therefore, the metal component originating from the polymerization initiator compound or the organoaluminum compound (I) is preferably removed, dependently on the purpose of the use of the polymer, after the termination of the polymerization. As the method for removing such a metal component, a method comprising subjecting the polymer to cleaning treatment, such as washing treatment with an acidic aqueous solution or adsorbing treatment with an adsorbent such as an ion exchange resin, is effective. As the acidic aqueous solution, there may be used, for example, hydrochloric acid, aqueous sulfuric acid solution, aqueous nitric acid solution, aqueous acetic acid solution, aqueous propionic acid solution, aqueous citric acid solution, or the like.

The method for separating the polymer from the reaction mixture after the termination of the polymerization is not particularly limited. A method according to any one of known methods can be adopted. For example, there may be adopted a method comprising pouring the reaction mixture into a poor solvent for the polymer to precipitate the polymer, or a method comprising distilling the solvent away from the reaction mixture to gain the polymer.

According to the polymerization processes (X) and (Y) of the present invention, a polymer having any molecular weight can be produced. The molecular weight of the polymer that can be produced extends over a wide range. In general, the number average molecular weight thereof is preferably within the range of 1000 to 1000000 in view of handling performance, fluidity and mechanical properties of the resultant polymer. According to the polymerization processes (X) and (Y) of the present invention, a polymer having a highly uniform molecular weight (that is, a narrow molecular weight distribution) can be usually obtained. A polymer having a molecular weight distribution value (Mw/Mn) of 1.5 or less can be produced. However, a polymer having a wide molecular weight distribution can be intentionally produced by controlling the addition speed of the monomers to the polymerization system, the diffusion rate of the monomers into the polymerization system, or the like.

The present invention will be more specifically described by way of working examples. However, the present invention is not limited to the following working examples. Eamples 1–10 described below are experimental examples according to the polymerization process (X) of the present invention, and Examples 11–15 described below are experimental examples according to the polymerization process (Y) of the present invention.

In the examples and the like described below, chemical substances were dried and purified according to a usual way, and were then deaerated with nitrogen. The thus obtained chemical substances were used. Transportation and supply of the chemical substances were performed under the atmosphere of nitrogen.

EXAMPLE 1

Synthesis Example of a Styrene/tert-butyl Methacrylate Block Copolymer

The present example is a production example of a styrene/tert-butyl methacrylate block copolymer, comprising the step of preparing polystyryllithium (an organic alkali metal compound) by anionic polymerization of styrene, the step of preparing a polymerization initiator compound by addition reaction of butadiene, and the step of polymerizing tert-butyl methacrylate in the presence of diisobutyl(2,6-di-tert-butyl-4-methylphenoxy)aluminum (an organoaluminum compound). Using the fact that any styrene polymer has a property of UV absorption and any tert-butyl methacrylate polymer does not have a property of UV absorption, the block efficiency in the block copolymerization (the initiation efficiency in the polymerization of tert-butyl methacrylate) was obtained.

(1) A magnetic stirrer chip was put into a 50 ml Schlenk tube with a three-way cock, and then the inside thereof was replaced by nitrogen. Thereto were added 25 ml of cyclohexane and 1.0 ml of a cyclohexane solution containing 0.13 mmol of sec-butyllithium. To this solution was added 2.0 g of styrene, and then the resultant solution was stirred at 40° C. for 3 hours to prepare a solution containing polystyryllithium.

(2) To the solution in the Schlenk tube, which was obtained in the above-mentioned step (1), was added 0.20 ml of a cyclohexane solution containing 0.30 mmol of butadiene at 40° C. Immediately, the color of solution was changed from orange color to colorlessness. Stirring was continued at the same temperature for 10 minutes.

About 0.5 ml of a sample was collected from the resultant reaction mixture solution, and subjected to gas chromatography (hereinafter referred to as "GC"). As a result, it was proved that the conversion of butadiene and styrene was 99% or more. Analysis of GPC (reduced to polystyrene) proved that the peak top molecular weight of the resultant addition reaction product of polystyryllithium and butadiene was 17100, the number average molecular weight thereof was 16400, and the ratio of the weight average molecular weight to the number average molecular weight (Mw/Mn) was 1.03.

(3) The solution in the Schlenk tube, which was obtained in the step (2), was cooled to 15° C., and then 0.81 ml of a toluene solution containing 0.65 mmol of diisobutyl(2,6-di-tert-butyl-4-methylphenoxy)aluminum was added thereto. The resultant solution was stirred for 10 minutes.

Next, while the resultant solution was vigorously stirred, 1.0 g of tert-butyl methacrylate was added thereto. Polymerization was conducted at 15° C. for 5 hours with stirring. Thereafter, about 0.05 ml of methanol was added thereto, so as to terminate the polymerization.

A part of the resultant reaction mixture solution was sampled and was analyzed by GC. As a result, it was proved that the conversion of tert-butyl methacrylate was 100%.

The solvent was removed from the resultant reaction mixture solution by vacuum drying, to obtain apolymer. GPC-UV (254 nm) measurement (reduced to polystyrene) proved that the resultant polymer was a mixture of a block copolymer (Mt=29100) and a polymer originating from the polymerization initiator compound (Mt=18000; polystyrene having a butadiene fragment at its terminal) and the weight ratio of the former to the latter was 73/27. This demonstrated that the block efficiency of the block copolymerization was 73%.

COMPARATIVE EXAMPLE 1

Preparation of polystyryllithium by anionic polymerization of styrene, preparation of a polymerization initiator compound by addition reaction of butadiene, and polymerization of tert-butyl methacrylate in the presence of an organoaluminum compound were successively performed in the same way as in Example 1 except that instead of diisobutyl(2,6-di-tert-butyl-4-methylphenoxy)aluminum, triethylaluminum of the mole equivalent thereto was used as the organoaluminum compound.

GPC analysis (reduced to polystyrene) of the resultant polymerization initiator compound proved that Mt was 16900, Mn was 16200 and Mw/Mn was 1.03.

After the step of polymerization of tert-butyl methacrylate, the resultant reaction mixture solution was analyzed by GC. As a result, it was proved that the conversion of tert-butyl methacrylate was about 100%.

GPC-UV (254 nm) measurement (reduced to polystyrene) proved that the polymer obtained after the solvent was removed was a mixture of a higher molecular weight component (Mt=34100 and Mn=35700) and a polymer originating from the polymerization initiator compound (Mt=17400 and Mn=16600; polystyrene having a butadiene fragment at its terminal) and the weight ratio of the former to the latter was 63/37. From the fact that about the area ratio of the peak of the higher molecular weight component, the result measured with a GPC-UV detector was substantially equal to the result measured with a GPC-RI detector, and the fact that the Mt of the higher molecular weight component was about two times Mt of the polymer originating from the polymerization initiator compound, it was presumed that the main of the higher molecular weight component was a dimer of the polymerization initiator compound (a coupled product obtained by nucleophilically adding two molecules of the polymerization initiator compound anion to the carbonyl group of one molecule of tert-butyl methacrylate). This fact demonstrated that the main component of the resultant polymer was polystyrenes containing butadiene fragment.

COMPARATIVE EXAMPLE 2

Preparation of polystyryllithium by anionic polymerization of styrene, preparation of a polymerization initiator compound by addition reaction of butadiene, and polymerization of tert-butyl metha6rylate in the presence of an organoaluminum compound were successively performed in the same way as in Example 1 except that instead of diisobutyl(2,6-di-tert-butyl-4-methylphenoxy)aluminum, triisobutylaluminum of the mole equivalent thereto was used as the organoaluminum compound.

GPC analysis (reduced to polystyrene) of the resultant polymerization initiator compound proved that Mt was 17400, Mn was 16800 and Mw/Mn was 1.03.

After the step of polymerization of tert-butyl methacrylate, the resultant reaction mixture solution was analyzed by GC. As a result, it was proved that the conversion of tert-butyl methacrylate was about 100%.

GPC-UV (254 nm) measurement (reduced to polystyrene) proved that the polymer obtained after the solvent was removed was a mixture of a higher molecular weight component (Mt=34800 and Mn=37300) and a polymer originating from the polymerization initiator compound.(Mt=18200 and Mn=17500; polystyrene having a butadiene fragment at its terminal) and the weight ratio of the former to the latter was 51/49. From the fact that about the area ratio of the peak of the higher molecular weight component, the result measured with a GPC-UV detector was substantially equal to the result measured with a GPC-RI detector, and the fact that the Mt of the higher molecular weight component was about two times Mt of the polymer originating from the polymerization initiator compound, it was presumed that the main of the higher molecular weight component was a dimer of the polymerization initiator compound (a coupled product obtained by nucleophilically adding two molecules of the polymerization initiator compound anion to the carbonyl group of one molecule of tert-butyl methacrylate). This fact demonstrated that the main component of the resultant polymer was polystyrenes containing butadiene fragment.

The following can be understood from results of the Example 1 and results of Comparative Examples 1 and 2: in the case that in polymerization of a methacrylic ester in the presence of an organoaluminum compound using a polymerization initiator compound comprising an addition reaction product of an organic alkali metalcompound and a conjugated diene compound, the above-mentioned specific organoaluminum compound (I) is used as the organoaluminum compound (Example 1), polymerization with a high initiation efficiency (block efficiency) can be achieved even under such polymerization conditions that any polymerization does not advance in the case that trialkylaluminum, which is common as the organoaluminum compound, is used (Comparative Examples 1 and 2).

EXAMPLE 2

Synthesis Example of a Styrene/methyl Methacrylate Block Copolymer

The present example is a production example of a styrene/methyl methacrylate block copolymer, comprising the step of preparing polystyryllithium (an organic alkali metal compound) by anionic polymerization of styrene, the step of preparing a polymerization initiator compound by addition reaction of butadiene, and the step of polymerizing methyl methacrylate in the presence of diisobutyl(2,6-di-tert-butyl-4-methylphenoxy)aluminum (an organoaluminum compound).

(1) A magnetic stirrer chip was put into a 50 ml Schlenk tube with a three-way cock, and then the inside thereof was replaced by nitrogen. Thereto were added 25 ml of toluene and 0.12 ml of a cyclohexane solution containing 0.15 mmol of sec-butyllithium. To this solution was added 0.75 g of styrene, and then the resultant solution was stirred at 23° C. for 1.5 hours to prepare a solution containing polystyryllithium.

(2) To the solution in the Schlenk tube, which was obtained in the above-mentioned step (1), was added 0.40 ml of a cyclohexane solution containing 0.60 mmol of butadiene at 23° C. Immediately, the color of solution was changed from orange color to colorlessness. Stirring was continued at the same temperature for 10 minutes.

A part of the resultant reaction mixture solution was sampled, and subjected to GC analysis. As a result, it was proved that the conversion of butadiene and styrene was 99% or more. Analysis of GPC (reduced to polystyrene) proved that Mn of the resultant addition reaction product of polystyryllithium and butadiene was 5700 and Mw/Mn was 1.03.

(3) The solution in the Schlenk tube, which was obtained in the step (2), was cooled to −30° C., and then 1.0 ml of a toluene solution containing 0.80 mmol of diisobutyl(2,6-di-tert-butyl-4-methylphenoxy)aluminum was added thereto. The resultant solution was stirred for 10 minutes.

Next, while the resultant solution was vigorously stirred, 2.25 g of methyl methacrylate was added thereto. Polymerization was conducted at −30° C. for 2 hours with stirring. Thereafter, about 0.05 ml of methanol was added thereto, so as to terminate the polymerization.

The resultant reaction mixture solution was subjected to a precipitation treatment with 300 ml of methanol, to obtain a polymer. The yield of the resultant polymer was about 100%. GPC-UV (254 nm) measurement (reduced to polystyrene) proved that the resultant polymer was a mixture of a block copolymer (Mn=23300 and Mw/Mn=1.05) and a polymer originating from the polymerization initiator compound (polystyrene having a butadiene fragment at its terminal) and the weight ratio of the former to the latter was 96/4. This demonstrated that the block efficiency of the block copolymerization was 96%.

The used chemical substances, adopted polymerization conditions and results are shown in Table 1 described below.

EXAMPLE 3

Synthesis Example of Styrene/methyl Methacrylate Block Copolymer

Preparation of polystyryllithium by anionic polymerization of styrene, preparation of a polymerization initiator compound by addition reaction of butadiene, and polymerization of methyl methacrylate in the presence of an organoaluminum compound were successively performed in the same way as in Example 2 except that the temperature when diisobutyl(2,6-di-tert-butyl-4-methylphenoxy)aluminum was added, the temperature when methyl methacrylate was added, and polymerization temperature were changed from −30° C. to 0° C. and the time for polymerization of methyl methacrylate was changed from 2 hours to 1 hour.

GPC analysis (reduced to polystyrene) of the resultant polymerization initiator compound proved that Mn was 5200 and Mw/Mn was 1.03.

After the step of polymerizing methyl methacrylate, the resultant reaction mixture solution was subjected to a precipitation treatment to obtain a polymer. The yield of the resultant polymer was about 100%. GPC-UV (254 nm) measurement (reduced to polystyrene) proved that the resultant polymer was a mixture of a block copolymer (Mn=23600 and Mw/Mn=1.06), a dimer of the polymerization initiator compound (a compound presumed as a coupled product obtained by nucleophilically adding two molecules of the polymerization initiator compound anion to the carbonyl group of one molecule of methyl methacrylate) and a polymer originating from the polymerization initiator compound (polystyrene having a butadiene fragment at its terminal), and the weight ratio among them was 85/6/9. This demonstrated that the block efficiency of the block copolymerization was 85%.

The used chemical substances, adopted polymerization conditions and results are shown in Table 1 described below.

EXAMPLE 4

Synthesis Example of Styrene/methyl Methacrylate Block Copolymer

Preparation of polystyryllithium by anionic polymerization of styrene, preparation of a polymerization initiator compound by addition reaction of a conjugated diene compound, and polymerization of methyl methacrylate in the presence of an organoaluminum compound were successively performed in the same way as in Example 2 except that instead of butadiene, isoprene of the mole equivalent thereto was used as the conjugated diene compound.

GPC analysis (reduced to polystyrene) of the resultant polymerization initiator compound proved that Mn was 5300 and Mw/Mn was 1.04.

After the step of polymerizing methyl methacrylate, the resultant reaction mixture solution was subjected to a precipitation treatment to obtain a polymer. The yield of the resultant polymer was about 100%. GPC-UV (254 nm) measurement (reduced to polystyrene) proved that the resultant polymer was a mixture of a block copolymer (Mn=24500 and Mw/Mn=1. 07), a dimer of the polymerization initiator compound (a compound presumed as a coupled product obtained by nucleophilically adding two molecules of the polymerization initiator compound anion to the carbonyl group of one molecule of methyl methacrylate) and a polymer originating from the polymerization initiator compound (polystyrene having a isoprene fragment at its terminal), and the weight ratio among them was 80/8/12. This demonstrated that the block efficiency of the block copolymerization was 80%.

The used chemical substances, adopted polymerization conditions and results are shown in Table 1 described below.

EXAMPLE 5

Synthesis Example of Styrene/methyl Methacrylate Block Copolymer

Preparation of polystyryllithium by anionic polymerization of styrene, preparation of a polymerization initiator compound by addition reaction of butadiene, and polymerization of methyl methacrylate in the presence of an organoaluminum compound were successively performed in the same way as in Example 3 except that a solution prepared by mixing 1.0 ml of a toluene solution containing 0.80 mmol of isobutylbis(2,6-di-tert-butyl-4-methylphenoxy)aluminum with 0.22 g of 1,2-dimethoxyethane was used instead of 1.0 ml of the toluene solution containing 0.80 mmol of diisobutyl(2,6-di-tert-butyl-4-methylphenoxy)aluminum.

GPC analysis (reduced to polystyrene) of the resultant polymerization initiator compound proved that Mn was 5500 and Mw/Mn was 1.03.

After the step of polymerizing methyl methacrylate, the resultant reaction mixture solution was subjected to a precipitation treatment to obtain a polymer. The yield of the resultant polymer was about 100%. GPC-UV (254 nm) measurement (reduced to polystyrene) proved that the resultant polymer. was a mixture of a block copolymer (Mn=23800 and Mw/Mn=1.06) and a polymer originating from the polymerization initiator compound (polystyrene having a butadiene fragment at its terminal) and the weight ratio of the former to the latter was 93/7. This demonstrated that the block efficiency of the block copolymerization was 93%.

The used chemical substances, adopted polymerization conditions and results are shown in Table 1 described below.

COMPARATIVE EXAMPLE 3

Preparation of polystyryllithium by anionic polymerization of styrene, preparation of a polymerization initiator compound by addition reaction of butadiene, and polymerization of methyl methacrylate in the presence of an organoaluminum compound were successively performed in the same way as in Example 2 except that instead of diisobutyl (2,6-di-tert-butyl-4-methylphenoxy)aluminum, triethylaluminum of the mole equivalent thereto was used as the organoaluminum compound and the time for polymerizing methyl methacrylate was extended from 2 hours to 24 hours.

GPC analysis (reduced to polystyrene) of the resultant polymerization initiator compound proved that Mn was 5600 and Mw/Mn was 1.03.

After the step of polymerizing methyl methacrylate, the resultant reaction mixture solution was subjected to a precipitation treatment to obtain a polymer. The yield of the resultant polymer was about 100%. GPC-UV (254 nm) measurement (reduced to polystyrene) proved that the resultant polymer was a mixture of a block copolymer (Mn=49800 and Mw/Mn=1.14), a dimer of the polymerization initiator compound (a compound presumed as a coupled product obtained by nucleophilically adding two molecules of the polymerization initiator compound anion to the carbonyl group of one molecule of methyl methacrylate) and a polymer originating from the polymerization initiator compound (polystyrene having a butadiene fragment at its terminal) and the weight ratio among them was 37/42/21. This demonstrated that the block efficiency of the block copolymerization was 37%.

The used chemical substances, adopted polymerization conditions and results are shown in Table 1 described below.

COMPARATIVE EXAMPLE 4

Preparation of polystyryllithium by anionic polymerization of styrene, preparation of a polymerization initiator compound by addition reaction of butadiene, and polymerization of methyl methacrylate in the presence of an organoaluminum compound were successively performed in the same way as in Comparative Example 3 except that instead of triethylaluminum, triisobutylaluminum of the mole equivalent thereto was used as the organoaluminum compound.

GPC analysis (reduced to polystyrene) of the resultant polymerization initiator compound proved that Mn was 5100 and Mw/Mn was 1.04.

After the step of polymerizing methyl methacrylate, the resultant reaction mixture solution was subjected to a precipitation treatment to obtain a polymer. The yield of the resultant polymer was about 100%. GPC-UV (254 nm) measurement (reduced to polystyrene) proved that the resultant polymer was a mixture of a block copolymer (Mn=41900 and Mw/Mn=1.12), a dimer of the polymerization initiator compound (a compound presumed as a coupled product obtained by nucleophilically adding two molecules of the polymerization initiator compound anion to the carbonyl group of one molecule of methyl methacrylate) and a polymer originating from the polymerization initiator compound (polystyrene having a butadiene fragment at its terminal) and the weight ratio among them was 41/35/24. This demonstrated that the block efficiency of the block copolymerization was 41%.

The used chemical substances, adopted polymerization conditions and results are shown in Table 1 described below.

COMPARATIVE EXAMPLE 5

Preparation of polystyryllithium by anionic polymerization of styrene and polymerization of methyl methacrylate in the presence of an organoaluminum compound were successively performed in the same way as in Example 2 except that polystyryllithium was used as the polymerization initiator compound for methyl methacrylate without being subjected to addition reaction using butadiene and the time for polymerizing methyl methacrylate was extended from 2 hours to 3 hours. When diisobutyl(2,6-di-tert-butyl-4-methylphenoxy)aluminum was added to the solution containing polystyryllithium, which was prepared by anionic polymerization of styrene, the color of the solution, which was orange color originating from the growing terminal anion of polystyrene, was lost and turned colorless. This change in the color of the solution demonstrated that the added organoaluminum compound formed an ate complex with the growing terminal anion of polystyrene.

GPC analysis (reduced to polystyrene) of the resultant polymerization initiator compound (polystyryllithium) proved that Mn was 5100 and Mw/Mn was 1.04.

After the step of polymerizing methyl methacrylate, the resultant reaction mixture solution was subjected to a precipitation treatment to obtain a polymer. $^1$H-NMR analysis proved that the conversion of methyl methacrylate was about 6% and methyl methacrylate was hardly polymerized. GPC-UV (254 nm) measurement (reduced to polystyrene) also proved that the resultant polymer was a polymer originating from the polymerization initiator compound (polystyrene).

The used chemical substances, adopted polymerization conditions and results are shown in Table 1 described below.

COMPARATIVE EXAMPLE 6

Preparation of polystyryllithium by anionic polymerization of styrene, preparation of a polymerization initiator compound by addition reaction of 1,1-diphenylethylene and polymerization of methyl methacrylate in the presence of an organoaluminum compound were successively performed in the same way as in Example 2 except that the step of preparation of the polymerization initiator compound by addition reaction of butadiene was changed to the step of preparation of the polymerization initiator compound comprising addition of 0.60 ml of a cyclohexane solution containing 0.60 mmol of 1,1-diphenylethylene to a solution containing polystyryllithium, which was prepared by anionic polymerization of styrene, and reaction at 50° C. for 6 hours and that the time for polymerizing methyl methacrylate was extended from 2 hours to 3 hours. The color of the solution containing polystyryllithium, which was orange, changed to dark red color after the addition of 1,1-diphenylethylene. This phenomenon suggests that the terminal of polystyrene was capped with 1,1-diphenylethylene so that its terminal anion changed to 1,1-diphenylmethylene anion. The color of the solution containing the polymerization initiator compound, which was dark red color originating from the 1,1-diphenylmethylene anion, changed to orange color after the addition of diisobutyl(2,6-di-tert-butyl-4-methylphenoxy) aluminum. This phenomenon suggests that the added organoaluminum compound formed an ate complex with the 1,1-diphenylmethylene anion.

GPC analysis (reduced to polystyrene) of the resultant polymerization initiator compound proved that Mn was 5600 and Mw/Mn was 1.03.

After the step of polymerizing methyl methacrylate, the resultant reaction mixture solution was subjected to a precipitation treatment to obtain a polymer. The yield of the resultant polymer was about 100%. GPC-UV (254 nm) measurement (reduced to polystyrene) proved that the resultant polymer was a mixture of a block copolymer (Mn=38800 and Mw/Mn=1.07), a dimer of the polymerization initiator compound (a compound presumed as a coupled product obtained by nucleophilically adding two molecules of the polymerization initiator compound anion to the carbonyl group of one molecule of methyl methacrylate) and a polymer originating from the polymerization initiator compound (polystyrene having a 1,1-diphenylethylene fragment at its terminal) and the weight ratio among them was 54/9/33. This demonstrated that the block efficiency of the block copolymerization was 54%.

The used chemical substances, adopted polymerization conditions and results are shown in Table 1 described below.

COMPARATIVE EXAMPLE 7

Preparation of polystyryllithium by anionic polymerization of styrene, preparation of a polymerization initiator compound by addition reaction of α-methylstyrene and polymerization of methyl methacrylate in the presence of an organoaluminum compound were successively performed in the same way as in Example 2 except that the step of preparation of the polymerization initiator compound by addition reaction of butadiene was changed to the step of preparation of the polymerization initiator compound comprising addition of 1.8 mmol of α-methylstyrene to a solution containing polystyryllithium, which was prepared by anionic polymerization of styrene, and reaction at 50° C. for 3 hours and that the time for polymerizing methyl methacrylate was extended from 2 hours to 3 hours. The color of the solution containing polystyryllithium, which was orange, changed to dark red color after the addition of α-methylstyrene. This phenomenon suggests that the terminal of polystyrene was capped with α-methylstyrene so that its terminal anion changed to α-methylstyryl anion. The color of the solution containing the polymerization initiator compound, which was dark red color originating from the α-methylstyryl anion, changed to orange color after the addition of diisobutyl(2,6-di-tert-butyl-4-methylphenoxy) aluminum. This phenomenon suggests that the added organoaluminum compound formed an ate complex with the α-methylstyryl anion.

GPC analysis (reduced to polystyrene) of the resultant polymerization initiator compound proved that Mn was 6100 and Mw/Mn was 1.04.

After the step of polymerizing methyl methacrylate, the resultant reaction mixture solution was subjected to a precipitation treatment to obtain a polymer. $^1$H-NMR analysis proved that the conversion of methyl methacrylate was about 3% and methyl methacrylate was hardly polymerized. GPC-UV (254 nm) measurement (reduced to polystyrene) also proved that the resultant polymer was a polymer originating from the polymerization initiator compound (polystyrene).

The used chemical substances, adopted polymerization conditions and results are shown in Table 1 described below.

TABLE 1

| | Polymerization conditions | | | | | Polymerization results | | | |
|---|---|---|---|---|---|---|---|---|---|
| | Unsaturated compound for an initiator | Initiator, Mn | Organo-aluminum compound | Additive | temperature (° C.) | Polymerization time (hour) | Conversion of monomer (%) | Block copolymer Mn | Block copolymer Mw/Mn | Block efficiency (%) |
| Example 2 | 1,3-butadiene | 5700 | iB$_2$Al(BHT) | — | −30 | 2 | 100 | 23300 | 1.05 | 96 |
| Example 3 | 1,3-butadiene | 5200 | iB$_2$Al(BHT) | — | 0 | 1 | 100 | 23600 | 1.06 | 85 |
| Example 4 | isoprene | 5300 | iB$_2$Al(BHT) | — | −30 | 2 | 100 | 24500 | 1.07 | 80 |
| Example 5 | 1,3-butadiene | 5500 | iBAl(BHT)$_2$ | DME | 0 | 1 | 100 | 23800 | 1.06 | 93 |
| Comparative Example 3 | 1,3-butadiene | 5600 | ET$_3$Al | — | −30 | 24 | 100 | 49800 | 1.14 | 37 |
| Comparative Example 4 | 1,3-butadiene | 5100 | iB$_3$Al | — | −30 | 24 | 100 | 41900 | 1.12 | 41 |
| Comparative Example 5 | none | 5100 | iB$_2$Al(BHT) | — | −30 | 3 | about 6 | — | — | — |
| Comparative Example 6 | 1,1-diphenyl-ethylene | 5600 | iB$_2$Al(BHT) | — | −30 | 3 | 100 | 38800 | 1.07 | 54 |
| Comparative Example 7 | α-methyl-styrene | 6100 | iB$_2$Al(BHT) | — | −30 | 3 | about 3 | — | — | — |

In the above-mentioned Table 1, symbols in the columns of "organoaluminum compound" and "additive" mean the following compounds.

iB$_2$Al(BHT)$_2$: diisobutyl(2,6-di-t-butyl-4-methylphenoxy)aluminum iBAl(BHT)$_2$: isobutylbis(2,6-di-t-butyl-4-methylphenoxy)aluminum Et$_3$Al: triethylaluminum iB$_3$Al: triisobutylaluminum DME: 1,2-dimethoxyethane The following can be understood from results of the Examples 2–5: in the case that in polymerization of a methacrylic ester in the presence of an organoaluminum compound using an anionic polymerization initiator compound, an addition reaction product of an organic alkali metal compound such as polystyryllithium and a conjugated diene compound is used as the anionic polymerization initiator compound and the above-mentioned specific organoaluminum compound (I) is used as the organoaluminum compound, a high initiation efficiency (block efficiency) can be attained. On the other hand, it can be understood from results of Comparative Examples 3–7 that when trialkylaluminum, which is a common organoaluminum compound, is used as the organoaluminum compound (Comparative Examples 3 and 4), the initiation efficiency (block efficiency) becomes low and when an organic alkali metal compound such as polystyryllithium is used as it is or in the form of an addition reaction product with an unsaturated compound other than conjugated diene compounds, as the anionic polymerization initiator compound (Comparative Examples 5–7), the conversion of monomer becomes very low or the initiation efficiency (block efficiency) becomes low.

EXAMPLE 6

Synthesis Example of a Styrene/n-butyl Acrylate Block Copolymer

The present example is a production example of a styrene/n-butyl acrylate block copolymer, comprising the step of preparing polystyryllithium (an organic alkali metal compound) by anionic polymerization of styrene, the step of preparing a polymerization initiator compound by addition reaction of butadiene, and the step of polymerizing n-butyl acrylate in the presence of isobutylbis(2,6-di-tert-butyl-4-methylphenoxy)aluminum (an organoaluminum compound). The block efficiency in the block copolymerization (the initiation efficiency in the polymerization of n-butyl acrylate) was obtained from the ratio between the number average molecular weight (reduced to polystyrene) obtained by GPC measurement of the resultant block copolymer and the molecular weight of the block copolymer calculated on the basis of the used amount and yield.

Preparation of polystyryllithium by anionic polymerization of styrene, preparation of a polymerization initiator compound by addition reaction of butadiene and polymerization of n-butyl acrylate in the presence of an organoaluminum compound were successively performed in the same way as in Example 5 except that the temperature when a solution prepared by mixing a toluene solution containing isobutylbis(2,6-di-tert-butyl-4-methylphenoxy)aluminum with 1,2-dimethoxyethane was added was changed from 0° C. to −30° C., and the step in which 2.25 g of n-butyl acrylate was added at −30° C. and then polymerized at −30° C. for 5 minutes was conducted instead of the step in which 2.25 g of methyl methacrylate was added at 0° C. and then polymerized at 0° C. for 1 hour.

GPC analysis (reduced to polystyrene) of the resultant polymerization initiator compound proved that Mn was 5000 and Mw/Mn was 1.04.

After the step of polymerizing n-butyl acrylate, the resultant reaction mixture solution was subjected to a precipitation treatment to obtain a polymer. The yield of the resultant polymer was about 100%. GPC-UV (254 nm) measurement (reduced to polystyrene) proved that the resultant polymer was a mixture of a block copolymer (Mn=21500 and Mw/Mn=1.09), and a polymer originating from the polymerization initiator compound (polystyrene having a butadiene fragment at its terminal) and the weight ratio of the former to the latter was 96/4.

The block efficiency was estimated as 91% on the basis of the molecular weight of the polymerization initiator compound and the molecular weight and the yield of the block copolymer.

The used chemical substances, adopted polymerization conditions and results are shown in Table 2 described below.

EXAMPLE 7

Synthesis Example of a Styrene/n-butyl Acrylate Block Copolymer

Preparation of polystyryllithium by anionic polymerization of styrene, preparation of a polymerization initiator compound by addition reaction of butadiene and polymerization of n-butyl acrylate in the presence of an organoaluminum compound were successively performed in the same way as in Example 6 except that 0.50 ml of a toluene solution containing 0.40 mmol of isobutylbis(2,6-di-tert-butyl-4-methylphenoxy)aluminum was solely added instead of the solution prepared by mixing 1.0 ml of the toluene solution containing 0.80 mmol of isobutylbis(2,6-di-tert-butyl-4-methylphenoxy)aluminum with 0.22 g of 1,2-dimethoxyethane; instead of only n-butyl acrylate, a solution prepared by mixing n-butyl acrylate of the weight equivalent thereto with 0.50 ml of a toluene solution containing 0.40 mmol of isobutylbis(2,6-di-tert-butyl-4-methylphenoxy) aluminum was added; and the time for polymerizing n-butyl acrylate was changed from 5 minutes to 30 minutes.

GPC analysis (reduced to polystyrene) of the resultant polymerization initiator compound proved that Mn was 5100 and Mw/Mn was 1.02.

After the step of polymerizing n-butyl acrylate, the resultant reaction mixture solution was subjected to a precipitation treatment to obtain a polymer. The yield of the resultant polymer was about 100%. GPC-UV (254 nm) measurement (reduced to polystyrene) proved that the resultant polymer was a mixture of a block copolymer (Mn=24000 and Mw/Mn=1.12) and a polymer originating from the polymerization initiator compound (polystyrene having a butadiene fragment at its terminal) and the weight ratio of the former to the latter was 93/7.

The block efficiency was estimated as 81% on the basis of the molecular weight of the polymerization initiator compound and the molecular weight and the yield of the block copolymer.

The used chemical substances, adopted polymerization conditions and results are shown in Table 2 described below.

COMPARATIVE EXAMPLE 8

Preparation of polystyryllithium by anionic polymerization of styrene, preparation of a polymerization initiator compound by addition reaction of butadiene and polymerization of n-butyl acrylate in the presence of an organoaluminum compound were successively performed in the same way as in Example 6 except that instead of isobutylbis(2,6-di-tert-butyl-4-methylphenoxy)aluminum, triisobutylaluminum of the mole equivalent thereto was used and the time for polymerizing n-butyl acrylate was changed from 5 minutes to 6 hours.

GPC analysis (reduced to polystyrene) of the resultant polymerization initiator compound proved that Mn was 5800 and Mw/Mn was 1.04.

After the step of polymerizing n-butyl acrylate, the resultant reaction mixture solution was subjected to a precipitation treatment to obtain a polymer. $^1$H-NMR analysis of the resultant polymer proved that no n-butyl acrylate was polymerized. GPC-UV (254 nm) measurement (reduced to polystyrene) proved that the resultant polymer was a polymer originating from the polymerization initiator compound (polystyrene having a butadiene fragment at its terminal).

The used chemical substances, adopted polymerization conditions and results are shown in Table 2 described below.

polymerizing methyl methacrylate in the presence of diisobutyl(2,6-di-tert-butyl-4-methylphenoxy)aluminum (an organoaluminum compound). The initiation efficiency in the polymerization of methyl methacrylate was obtained from the ratio between the number average molecular weight (reduced to polystyrene) obtained by GPC measurement of the methyl methacrylate polymer and the molecular weight of the methyl methacrylate polymer calculated on the basis of the used amount and yield.

(1) A magnetic stirrer chip was put into a 50 ml Schlenk tube with a three-way cock, and then the inside thereof was replaced by nitrogen. Thereto was added 18.5 ml of a cyclohexane solution containing 1.2 g of butadiene. To this solution was added 1.6 ml of a cyclohexane solution of sec-butyllithium (concentration: 1.3 M), and then the resultant solution was stirred at 0° C. for 24 hours to conduct reaction.

GPC measurement of the resultant reaction mixture solution proved that an oligobutadienyllithium having a number average molecular weight (Mn), reduced to polystyrene, of 1200 and a molecular weight distribution (Mw/Mn) of 1.18 was produced.

TABLE 2

| | Polymerization conditions | | | | | Polymerization results | | | |
|---|---|---|---|---|---|---|---|---|---|
| | Conjugated diene for an initiator | Initiator, Mn | Organo-aluminum compound | Additive | temperature (° C.) | Polymerization time | Conversion of monomer (%) | Block copolymer | | Block efficiency (%) |
| | | | | | | | | Mn | Mw/Mn | |
| Example 6 | 1,3-butadiene | 5000 | iBAl(BHT)$_2$ | DME | −30 | 5 minutes | 100 | 21500 | 1.09 | 91 |
| Example 7 | 1,3-butadiene | 5100 | iBAl(BHT)$_2$$^{a)}$ | — | −30 | 30 minutes | 100 | 24000 | 1.12 | 81 |
| Comparative Example 8 | 1,3-butadiene | 5800 | iB$_3$Al | DME | −30 | 6 hours | 0 | — | — | — |

In the above-mentioned Table 2, symbols in the columns of "organoaluminum compound" and "additive" mean the following compounds.

iBAl(BHT)$_2$: isobutylbis(2,6-di-t-butyl-4-methylphenoxy)aluminum iB$_3$Al: triisobutylaluminum DME: 1,2-dimethoxyethane a): addition in the form of a mixture with n-butyl acrylate The following can be understood from results shown in Table 2: in the case that in polymerization of an acrylic ester in the presence of an organoaluminum compound using an polymerization initiator compound comprising an addition reaction product of an organic alkali metal compound and a conjugated diene compound, the above-mentioned specific organoaluminum compound (I) is used as the organoaluminum compound (Examples 6 and 7), a high initiation efficiency (block efficiency) can be attained. However, in the case that trialkylaluminum, which is a common organoaluminum compound, is used (Comparative Example 8), polymerization reaction does not advance.

EXAMPLE 8

Synthesis Example of a Methyl Methacrylate Polymer

The present example is a production example of a methyl methacrylate polymer comprising the step of preparing oligobutadienyllithium (a polymerization initiator compound) by adding butadiene to sec-butyllithium in a small ratio of the former to the latter, and the step of (2) A magnetic stirrer chip was put into a 50 ml Schlenk tube with a three-way cock, and then the inside thereof was replaced by nitrogen. Thereto were added 15 ml of toluene and 1.5 ml portion of the cyclohexane solution of oligobutadienyllithium (concentration: 0.1 M), which was obtained in the above-mentioned step (1). This solution was cooled to −30° C., and then thereto was added 1.0 ml of a toluene solution containing 0.80 mmol of diisobutyl (2,6-di-tert-butyl-4-methylphenoxy)aluminum. The resultant solution was stirred for 10 minutes.

Next, 1.50 g of methyl methacrylate was added to the resultant solution while the solution was vigorously stirred. Polymerization was conducted with stirring at −30° C. for 2 hours. Thereafter, about 0.05 ml of methanol was added thereto so as to terminate the polymerization.

The resultant reaction mixture solution was subjected to a precipitation treatment with 300 ml of methanol to obtain a polymer. The yield of the resultant polymer was about 100%. GPC measurement (reduced to polystyrene) proved that the resultant polymer had an Mn of 11900 and an Mw/Mn of 1.07.

It was understood from these results that the initiation efficiency in the polymerization of methyl methacrylate was 93%.

The used chemical substances, adopted polymerization conditions and results are shown in Table 3 described below.

COMPARATIVE EXAMPLE 9

A magnetic stirrer chip was put into a 50 ml Schlenk tube with a three-way cock, and then the inside thereof was replaced by nitrogen. Thereto was added 15 ml of toluene and then the solution was cooled to −30° C. Thereto was added 0.95 ml of a cyclohexane solution of tert-butyllithium (concentration: 1.6 M). This solution was kept at −30° C., and then thereto was added 1.0 ml of a toluene solution containing 0.80 mmol of diisobutyl(2,6-di-tert-butyl-4-methylphenoxy)aluminum. The resultant solution was stirred for 10 minutes.

Next, 1.50 g of methyl methacrylate was added to the resultant solution while the solution was vigorously stirred. Polymerization was conducted with stirring at −30° C. for 2 hours. Thereafter, about 0.05 ml of methanol was added thereto so as to terminate the polymerization.

The resultant reaction mixture solution was subjected to a precipitation treatment with 300 ml of methanol to obtain a polymer. The yield of the resultant polymer was about 100%. GPC measurement (reduced to polystyrene) proved that the resultant polymer had an Mn of 13000 and an Mw/Mn of 1.11.

It was understood from these results that the initiation efficiency in the polymerization of methyl methacrylate was 77%.

The used chemical substances, adopted polymerization conditions and results are shown in Table 3 described below.

COMPARATIVE EXAMPLE 10

Polymerization of methyl methacrylate in the presence of an organoaluminum compound was tried in the same way as in Comparative Example 9 except that 1.15 ml of a cyclohexane solution of sec-butyllithium (concentration: 1.3 M) was used instead of 0.95 ml of the cyclohexane solution of tert-butyllithium (concentration: 1.6 M), and the time for polymerizing methyl methacrylate was extended from 2 hours to 6 hours.

However, it was demonstrated that no methyl methacrylate was polymerized.

The used chemical substances, adopted polymerization conditions and results are shown in Table 3 described below.

COMPARATIVE EXAMPLE 11

Polymerization of methyl methacrylate in the presence of an organoaluminum compound was tried in the same way as in Comparative Example 9 except that 1.0 ml of a cyclohexane solution of n-butyllithium (concentration: 1.5 M) was used instead of 0.95 ml of the cyclohexane solution of tert-butyllithium (concentration: 1.6 M), and the time for polymerizing methyl methacrylate was extended from 2 hours to 6 hours.

However, it was demonstrated that no methyl methacrylate was polymerized.

The used chemical substances, adopted polymerization conditions and results are shown in Table 3 described below.

TABLE 3

| | Polymerization conditions | | | | | Polymerization results | | | |
|---|---|---|---|---|---|---|---|---|---|
| | Initiator compound (solution) | | | | Polymerization | | | | |
| | Compound name | Solution concentration | Added amount | Organo-aluminum compound | temperature (° C.) | time (hour) | Conversion of monomer (%) | Polymer Mn | Polymer Mw/Mn | Initiation efficiency (%) |
| Example 8 | Oligo-butadienyl-lithium | 0.1 M | 1.5 ml | iB$_2$Al(BHT) | −30 | 2 | 100 | 11900 | 1.07 | 93 |
| Example 9 | tert-Butyl-lithium | 1.6 M | 0.95 ml | iB$_2$Al(BHT) | −30 | 2 | 100 | 13000 | 1.11 | 77 |
| Comparative Example 10 | sec-Butyl-lithium | 1.3 M | 1.15 ml | iB$_2$Al(BHT) | −30 | 6 | Not polymerized | — | — | — |
| Comparative Example 11 | n-Butyl-lithium | 1.5 M | 1.0 ml | iB$_2$Al(BHT) | −30 | 6 | Not polymerized | — | — | — |

In the above-mentioned Table 3, symbol in the column of "organoaluminum compound" means the following compound. iB$_2$Al(BHT): diisobutyl(2,6-di-t-butyl-4-methylphenoxy)aluminum The following can be understood from results of Example 8 shown in Table 3: in the case that in polymerization of a methacrylic ester, using an anionic polymerization initiator compound, in the presence of an organoaluminum compound having a chemical structure wherein one of three bonds of an aluminum atom is bonded through an oxygen atom to an aromatic ring, an addition reaction product of an organic alkali metal compound such as a low molecular weight alkyllithium and a conjugated diene compound is used as the anionic polymerization initiator compound, a high initiation efficiency (block efficiency) can be attained. On the other hand, it can be understood from results of Comparative Examples 9–11 described in Table 3 that when a common organoaluminum compound such as a low molecular weight alkyllithium is used as it is as the anionic polymerization initiator compound, the conversion of the methacrylic ester becomes very low or the initiation efficiency becomes low.

EXAMPLE 9

Synthesis Example of a Butadiene/methyl Methacrylate Diblock Copolymer

The present example is a production example of a butadiene/methyl methacrylate diblock copolymer comprising the step of preparing a living anion of polybutadiene (polybutadienyllithium: a polymerization initiator compound) by subjecting butadiene to addition reaction (polymerization) with sec-butyllithium (an organic alkali metal compound) in a large ratio of the former to the latter, and the step of polymerizing methyl methacrylate in the presence of isobutylbis(2,6-di-tert-butyl-4-methylphenoxy)aluminum (an organoaluminum compound).

(1) The inside of a 1 liter autoclave was replaced by nitrogen. Thereto were added 520 g of toluene and 2.5 ml of a cyclohexane solution of sec-butyllithium (concentration: 1.3 M). To the resultant solution was added 65 g of butadiene at 18° C., and then polymerization was conducted for 5 hours to obtain a living anion of polybutadiene.

A sample was collected from the resultant reaction mixture solution, and then GPC measurement thereof proved that the resultant polybutadiene had a number average molecular weight (Mn), reduced to polystyrene, of 29400 and a molecular weight distribution (Mw/Mn) of 1.01.

(2) The reaction mixture solution obtained in the step (1) was cooled to −3° C., and then thereto was added a mixture solution prepared by mixing 20 ml of a toluene solution of isobutylbis(2,6-di-tert-butyl-4-methylphenoxy)aluminum (concentration: 0.8 M) with 6 ml of 1,2-dimethoxyethane. The resultant solution was stirred for 10 minutes. Furthermore, thereto was added a mixture solution prepared by mixing 65 g of methyl methacrylate with 3 ml of a toluene solution of isobutylbis(2,6-di-tert-butyl-4-methylphenoxy)aluminum (concentration: 0.8 M). Polymerization was then conducted at 0° C. for 2 hours.

A sample was collected from the resultant reaction mixture solution. GPC measurement thereof proved that the resultant polymer had a number average molecular weight (Mn), reduced to polystyrene, of 49300 and a molecular weight distribution (Mw/Mn) of 1.03. No peak originating from polybutadiene (a homopolymer) obtained in the step (1) was observed, and it was proved that the resultant polymer was only a butadiene/methyl methacrylate diblockcopolymer(PBd-b-PMMA). Furthermore, $^1$H-NMR analysis of the sample proved that the weight ratio of the polybutadiene block to the polymethyl methacrylate block in the resultant polymer was 47/53 and the ratio (mole ratio) of the 1,4-bonds/the 1,2-bonds in the polybutadiene block was 10/90.

REFERENCE EXAMPLE 1

The present reference example is a production example of a block copolymer wherein a polybutadiene block was substantially changed to an ethylene/butylene copolymer block by hydrogenating the block copolymer obtained in Example 9.

A nickel/aluminum catalyst for hydrogenation (the nickel content: 1 mmol; the aluminum content: 3 mmol) was added to the reaction mixture solution which was finally obtained in Example 9. The resultant mixture solution was stirred under the atmosphere of pressured hydrogen (1 MPa) while the temperature thereof was raised to 80° C. At this temperature, reaction was conducted for 3 hours. During this reaction, the hydrogen pressure was kept at 1 MPa by supplying hydrogen.

$^1$H-NMR analysis of the resultant reaction mixture solution proved that in the produced polymer, 98% of the double bonds of the polybutadiene block was lost and a diblock copolymer having a hydrogenated polybutadiene block and a poly(methyl methacrylate) block ((hydrogenated PBd)-b-PMMA) was obtained.

EXAMPLE 10

Synthesis Example of an Isoprene/n-butyl Acrylate Diblock Copolymer

The present example is a production example of isoprene/n-butyl acrylate diblock copolymer comprising the step of preparing a living anion of polyisoprene (polyisoprenyllithium: a polymerization initiator compound) by subjecting isoprene to addition reaction (polymerization) with sec-butyllithium (an organic alkali metal compound) in a large ratio of the former to the latter, and the step of polymerizing n-butyl acrylate in the presence of isobutylbis(2,6-di-tert-butyl-4-methylphenoxy)aluminum (an organoaluminum compound).

(1) The inside of a 1 liter autoclave was replaced by nitrogen. Thereto were added 440 g of toluene and 2.8 ml of a toluene solution of sec-butyllithium (concentration: 1.3 M). To the resultant solution was added 55 g of isoprene at 23° C., and then polymerization was conducted for 4 hours to obtain a living anion of polyisoprene.

A sample was collected from the resultant reaction mixture solution. GPC measurement thereof proved that the resultant polyisoprene had a number average molecular weight (Mn), reduced to polystyrene, of 11000 and a molecular weight distribution (Mw/Mn) of 1.02.

(2) The reaction mixture solution obtained in the step (1) was cooled to −31° C., and then thereto was added a mixture solution prepared by mixing 40 ml of a toluene solution of isobutylbis(2,6-di-tert-butyl-4-methylphenoxy)aluminum (concentration: 0.8 M) with 7 ml of 1,2-dimethoxyethane. The resultant solution was stirred for 10 minutes. Furthermore, thereto was added a mixture solution prepared by mixing 55 g of n-butyl acrylate with 5 ml of a toluene solution of isobutylbis(2,6-di-tert-butyl-4-methylphenoxy)aluminum (concentration: 0.8 M), so as to conduct polymerization at −27° C. for 2 hours.

A sample was collected from the resultant reaction mixture solution. GPC measurement thereof proved that the resultant polymer had a number average molecular weight (Mn), reduced to polystyrene, of 37800 and a molecular weight distribution (Mw/Mn) of 1.03. No peak originating from polyisoprene (a homopolymer) obtained in the step (1) was observed, and it was proved that the resultant polymer was only an isoprene/n-butyl acrylate diblock copolymer (PIp-b-PnBA). Furthermore, $^1$H-NMR analysis of the sample proved that the weight ratio of the polyisoprene block to the poly(n-butyl acrylate) block in the resultant polymer was 49/51 and the ratio (mole ratio) of the 1,4-bonds/the 3,4-bonds in the polyisoprene block was 7/93.

A GPC chart of the resultant isoprene/n-butyl acrylate diblock copolymer and a GPC chart of polyisoprene prepared in the step (1) are shown together in FIG. 1. In FIG. 1, curves A and B show the isoprene/n-butyl acrylate diblock copolymer and the polyisoprene, respectively.

Examples 9 and 10 demonstrate that according to the production process of the present invention, a block copolymer having a diene polymer block and a (meth)acrylic ester polymer block can be produced with a narrow molecular weight distribution and a very high block efficiency.

As is evident from Examples 1–10, according to the polymerization process (X) of the present invention, various (meth)acrylic esters such as tert-butyl methacrylate, methyl methacrylate or n-butyl acrylate can be anionically polymerized with a high initiation efficiency and a high living polymerization property in a solvent, such as a hydrocarbon solvent, which can easily be recovered and reused under a mild cooling condition, for example, under a temperature condition of −30 to 15° C., using an organic alkali metal compound, such as sec-butyllithium, which has relatively good convenience. Accordingly, according to this polymerization process, a (meth)acrylic ester polymer, such as a block copolymer or the like, can be produced with industrial profitability.

REFERENCE EXAMPLE 2

Preparation of 1,1-Diphenyl-3-methylpentyllithium

To a 500 ml Schlenk tube, in which a magnetic stirrer chip was put, was added 2.0 g of 1,1-diphenylethylene and then the inside thereof was replaced by nitrogen. Thereto were added 190 ml of toluene and 7.7 ml of a cyclohexane solution of sec-butyllithium (concentration: 1.3 M). The resultant solution was stirred at room temperature for 2 days to conduct reaction. In this way, a toluene solution of 1,1-diphenyl-3-methylpentyllithium (DPMPLi) (concentration: 0.05 M) was obtained. Example 11 (Polymerization example of methyl methaciylate, using 1,1-diphenyl-3-methylpentyllithium)

The present example is a polymerization example of methyl methacrylate (MMA) wherein 1,1-diphenyl-3-methylpentyllithium (DPMPLi), which is an addition reaction product of sec-butyllithium (an organic alkali metal compound) and 1,1-diphenylethylene, was used as a polymerization initiator compound to bring a mixture of diisobutyl(2,6-di-tert-butyl-4-methylphenoxy)aluminum (an organoaluminum compound) and MMA into contact with the above-mentioned polymerization initiator compound.

(1) At room temperature, 0.29 ml of a toluene solution containing 0.20 mmol of diisobutyl(2,6-di-tert-butyl-4-methylphenoxy)aluminum, and 2.0 g of MMA were stirred under the atmosphere of nitrogen for 10 minutes, to prepare a mixture (a liquid product) of the two.

(2) A magnetic stirrer chip was put into a 50 ml Schlenk tube with a three-way cock, and then the inside thereof was replaced by nitrogen. Thereto were added 20 ml of toluene and 4 ml of a toluene solution of DPMPLi obtained in Reference Example 2 (the DPMPLi content: 0.20 mmol). The resultant solution was cooled to −25° C. Next, to this solution was added the mixture of diisobutyl (2,6-di-tert-butyl-4-methylphenoxy)aluminum and MMA, which was obtained in the step (1), so as to conduct polymerization with stirring at −25° C. for 1 hour.

A sample was collected from the resultant reaction mixture solution. GC (gas chromatography) analysis thereof proved that the conversion of MMA was 100%.

GPC (gas permeation chromatography) measurement of the resultant polymer proved that poly(methyl methacrylate) having a number average molecular weight (Mn), reduced to polystyrene, of 15000 and a molecular weight distribution (Mw/Mn) of 1.09 was obtained. This fact demonstrated that the initiation efficiency thereof was 68%.

COMPARATIVE EXAMPLE 12

Polymerization was conducted with stirring at −25° C. for 1 hour in the same way as in the step (2) in Example 11 except that instead of the addition of the mixture of diisobutyl(2,6-di-tert-butyl-4-methylphenoxy)aluminum and MMA to the toluene solution of DPMPLi at −25° C., the procedure of adding 0.20 mmol of diisobutyl(2,6-di-tert-butyl-4-methylphenoxy)aluminum to the same solution and adding 2.0 g of MMA with which no substance was mixed thereto after 10 minutes was adopted.

A sample was collected from the resultant reaction mixture solution. GC analysis thereof proved that the conversion of MMA was 30%.

GPC measurement of the resultant polymer proved that poly(methyl methacrylate) having a number average molecular weight (Mn), reduced to polystyrene, of 33500 and a molecular weight distribution (Mw/Mn) of 1.09 was obtained. This fact demonstrated that the initiation efficiency thereof was 30%.

EXAMPLE 12

Polymerization Example of Methyl Methacrylate, Using 1,1-Diphenyl-3-methylpentyllithium (1) In the same way as in the step (1) in Example 11, 0.29 ml of a toluene solution containing 0.20 mmol of diisobutyl(2,6-di-tert-butyl-4-methylphenoxy)aluminum, and 0.02 g of MMA were used to prepare a mixture (a liquid product) of the two.

(2) In the same way as in the step (1) in Example 11, 1.14 ml of a toluene solution containing 0.80 mmol of diisobutyl(2,6-di-tert-butyl-4-methylphenoxy)aluminum, and 2.0 g of MMA were used to prepare a mixture (a liquid product) of the two.

(3) A magnetic stirrer chip was put into a 50 ml Schlenk tube with a three-way cock, and then the inside thereof was replaced by nitrogen. Thereto were added 20 ml of toluene and 4 ml of a toluene solution of DPMPLi obtained in Reference Example 2 (the DPMPLi content: 0.20 mmol). The resultant solution was cooled to −25° C. Next, to this solution was added the mixture of diisobutyl (2,6-di-tert-butyl-4-methylphenoxy)aluminum and MMA, which was obtained in the step (1), and the resultant solution was stirred at −25° C. for 5 minutes. To this solution was further added the mixture of diisobutyl (2,6-di-tert-butyl-4-methylphenoxy)aluminum and MMA, which was obtained in the step (2). The resultant solution was stirred at −25° C. for 1 hour to conduct polymerization.

A sample was collected from the resultant reaction mixture solution. GC analysis thereof proved that the polymerization ratio of MMA was 100%.

GPC measurement of the resultant polymer proved that poly(methyl methacrylate) having a number average molecular weight (Mn), reduced to polystyrene, of 11100 and a molecular weight distribution (Mw/Mn) of 1.10 was obtained. This fact demonstrated that the initiation efficiency thereof was 91%.

EXAMPLE 13

Synthesis Example of a Styrene/methyl Methacrylate Block Copolymer

The present example is a production example of a styrene/methyl methacrylate block copolymer (PSt-b-PMMA), comprising the step of preparing polystyryllithium (an organic alkali metal compound) by anionic polymerization of styrene, the step of preparing a polymerization initiator compound by addition reaction of the polystyryllithium and 1,1-diphenylethylene, the step of preparing a mixture of diisobutyl(2,6-di-tert-butyl-4-methylphenoxy)aluminum (an organoaluminum compound) and methyl methacrylate (MMA), and the step of polymerization of MMA by bringing the mixture into contact with the above-mentioned polymerization initiator compound. Using the fact that any styrene polymer has a property of UV absorption but any polymer of methyl methacrylate (PMMA) does not have a property of UV absorption, the block efficiency in the block copolymerization (the initiation efficiency in the polymerization of MMA) was obtained.

(1) A magnetic stirrer chip was put into a 50 ml Schlenk tube with a three-way cock, and then the inside thereof was replaced by nitrogen. Thereto were added 25 ml of toluene and 0.12 ml of a cyclohexane solution containing 0.15 mmol of sec-butyllithium. To this mixture solution was added 0.75 g of styrene, and then the resultant solution was stirred at 23° C. for 3 hours to prepare a solution containing polystyryllithium.

(2) To the solution in the Schlenk tube, which was obtained in the above-mentioned step (1), was added 0.14 g of 1,1-diphenylethylene. Reaction was conducted for 20 hours while the solution was heated at 40° C. As a result, the color of solution was changed from orange color to dark red color. This fact demonstrated that polystyryllithium was reacted with 1,1-diphenylethylene.

About 0.5 ml of a sample was collected from the resultant reaction mixture solution, and subjected to GC. As a result, it was proved that the conversion of styrene was 99% or more (on the basis of used styrene) and the conversion of 1,1-diphenylethylene was 19% (on the basis of used 1,1-diphenylethylene). Analysis of GPC proved that the number average molecular weight (Mn), reduced to polystyrene, of the resultant addition reaction product of polystyryllithium and 1,1-diphenylethylene was 5800 and the ratio of the weight average molecular weight to the number average molecular weight (Mw/Mn) was 1.02.

(3) In the same way as in the step (1) in Example 11, 0.19 ml of a toluene solution containing 0.15 mmol of diisobutyl(2,6-di-tert-butyl-4-methylphenoxy)aluminum, and 0.02 g of MMA were used to prepare a mixture (a liquid product) of the two.

(4) In the same way as in the step (1) in Example 11, 0.80 ml of a toluene solution containing 0.65 mmol of diisobutyl(2,6-di-tert-butyl-4-methylphenoxy)aluminum, and 2.23 g of MMA were used to prepare a mixture (a liquid product) of the two.

(5) The solution in the Schlenk tube, which was obtained in the step (2), was cooled to −30° C. Next, to this solution was added the mixture of diisobutyl(2,6-di-tert-butyl-4-methylphenoxy)aluminum and MMA, which was obtained in the step (3). The resultant solution was stirred for 10 minutes. To this solution was added the mixture of diisobutyl(2,6-di-tert-butyl-4-methylphenoxy)aluminum and MMA, which was obtained in the step (4). The resultant solution was stirred at the same temperature for 3 hours to conduct polymerization.

A part of the resultant reaction mixture solution was sampled, and was then analyzed by GC. As a result, it was proved that the conversion of MMA was 100%.

GPC-UV (254 nm) measurement of the resultant polymer component proved that the resultant polymer component was a mixture of a block copolymer having a number average molecular weight (Mn), reduced to polystyrene, of 24600 and a polymer having a number average molecular weight (Mn), reduced to polystyrene, of 5600 and originating from the polymerization initiator compound (polystyrene having a 1,1-diphenylethylene fragment at its terminal) and the weight ratio of the former to the latter was 90/10. This fact demonstrated that the block efficiency in the block copolymerization was 90%.

COMPARATIVE EXAMPLE 13

Synthesis Example of a Styrene/methyl Methacrylate Block Copolymer

The present comparative example is a production example of a styrene/methyl methacrylate block copolymer (PSt-b-PMMA) wherein the conditions in the steps (3)–(5) in Example 13 were changed in such a manner that polymerization was conducted by adding diisobutyl(2,6-di-tert-butyl-4-methylphenoxy)aluminum as an organoaluminum compound, separately from MMA, to the solution containing the polymerization initiator compound and subsequently adding MMA thereto.

(1) The same way as in the steps (1) and (2) in Example 13 was performed, to prepare a solution of an addition reaction product of the polystyryllithium and 1,1-diphenylethylene. The conversion of styrene was 99% or more (on the basis of used styrene). The conversion of 1,1-diphenylethylene was 21% (on the basis of used 1,1-diphenylethylene). Analysis of GPC proved that the number average molecular weight (Mn), reduced to polystyrene, of the resultant addition reaction product was 5600 and the ratio of the weight average molecular weight to the number average molecular weight (Mw/Mn) was 1.03.

(2) The solution in the Schlenk tube, which was obtained in the step (1), was cooled to −30C. To this solution was added 1.0 ml of a toluene solution containing 0.80 mmol of diisobutyl(2,6-di-tert-butyl-4-methylphenoxy) aluminum. The resultant solution was stirred for 10 minutes. To this solution was further added 2.25 g of MMA. The resultant solution was stirred at the same temperature for 3 hours to conduct polymerization.

A part of the resultant reaction mixture solution was sampled, and was then analyzed by GC. As a result, it was proved that the conversion of MMA was 100%.

GPC-UV (254 nm) measurement of the resultant polymer component proved that the resultant polymer component was a mixture of a block copolymer whose number average molecular weight (Mn), reduced to polystyrene, was 38800 and whose ratio of the weight average molecular weight to the number average molecular weight (Mw/Mn) was 1.07, a dimer of the polymerization initiator compound (a compound presumed as a coupled product obtained by nucleophilically adding two molecules of the polymerization initiator compound anion to the carbonyl group of one molecule of MMA) and a polymer originating from the polymerization initiator compound (polystyrene having a 1,1-diphenylethylene fragment at its terminal) and the weight ratio among them was 54/9/33. This fact demonstrated that the block efficiency in the block copolymerization was 54%.

EXAMPLE 14

Synthesis Example of a Styrene/methyl Methacrylate Block Copolymer

The present example is a production example of a styrene/methyl methacrylate block copolymer (PSt-b-PMMA), comprising the step of preparing polystyryllithium (an organic alkali metal compound) by anionic polymerization of styrene, the step of preparing a polymerization initiator compound by addition reaction of the polystyryllithium and 1,1-diphenylethylene, the step of preparing a mixture of isobutylbis(2,6-di-tert-butyl-4-methylphenoxy)aluminum (an organoaluminum compound) and methyl methacrylate (MMA), and the step of polymerization of MMA by bringing the mixture into contact with the above-mentioned polymerization initiator compound.

(1) The same way as in the steps (1) and (2) in Example 13 was performed, to prepare a solution containing an addition reaction product of the polystyryllithium and 1,1-diphenylethylene. The conversion of styrene was 99% or more (on the basis of used styrene). The conversion of 1,1-diphenylethylene was 21% (on the basis of used 1,1-diphenylethylene). Analysis of GPC proved that the number average molecular weight (Mn), reduced to polystyrene, of the resultant addition reaction product was 5600 and the ratio of the weight average molecular weight to the number average molecular weight (Mw/Mn) was 1.03.

(2) In the same way as in the step (1) in Example 11, 1.0 ml of a toluene solution containing 0.80 mmol of isobutylbis (2,6-di-tert-butyl-4-methylphenoxy)aluminum, 2.5 g of 1,2-dimethoxyethane and 2.25 g of MMA were used to prepare a mixture (a liquid product) of the three.

(3) The solution in the Schlenk tube, which was obtained in the step (1), was cooled to 0° C. Next, to this solution was added the mixture obtained in the step (2). The resultant solution was stirred for 3 hours to conduct polymerization.

A part of the resultant reaction mixture solution was sampled, and was then analyzed by GC. As a result, it was proved that the conversion of MMA was 100%.

GPC-UV (254 nm) measurement of the resultant polymer component proved that this polymer component was a mixture of a block copolymer having a number average molecular weight (Mn), reduced to polystyrene, of 23100 and a polymer having a number average molecular weight (Mn), reduced to polystyrene, of 5700 and originating from the polymerization initiator compound (polystyrene having a 1,1-diphenylethylene fragment at its terminal) and the weight ratio between them was 92/8. This fact demonstrated that the block efficiency in the block copolymerization was 92%.

EXAMPLE 15

Synthesis Example of a Styrene/n-butyl Acrylate Block Copolymer

The present example is a production example of a styrene/n-butyl acrylate block copolymer (PSt-b-PnBA), comprising the step of preparing polystyryllithium (an organic alkali metal compound) by anionic polymerization of styrene, the step of preparing a polymerization initiator compound by addition reaction of the polystyryllithium and 1,1-diphenylethylene, the step of preparing a mixture of isobutylbis(2,6-di-tert-butyl-4-methylphenoxy)aluminum (an organoaluminum compound) and n-butyl acrylate (nBA), and the step of polymerization of nBA by bringing the mixture into contact with the above-mentioned polymerization initiator compound.

(1) The same way as in the steps (1) and (2) in Example 13 was performed, to prepare a solution containing an addition reaction product of the polystyryllithium and 1,1-diphenylethylene. The conversion of styrene was 99% or more (on the basis of used styrene). The conversion of 1,1-diphenylethylene was 23% (on the basis of used 1,1-diphenylethylene). Analysis of GPC proved that the number average molecular weight (Mn), reduced to polystyrene, of the resultant addition reaction product was 5700 and the ratio of the weight average molecular weight to the number average molecular weight (Mw/Mn) was 1.03.

(2) In the same way as in the step (1) in Example 11, 1.0 ml of a toluene solution containing 0.80 mmol of isobutylbis (2,6-di-tert-butyl-4-methylphenoxy)aluminum, 2.5 g of 1,2-dimethoxyethane and 2.25 g of nBA were used to prepare a mixture (a liquid product) of the three.

(3) The solution in the Schlenk tube, which was obtained in the step (1), was cooled to −30° C. To this solution was added the mixture obtained in the step (2). The resultant solution was stirred for 2 hours to conduct polymerization.

A part of the resultant reaction mixture solution was sampled, and was then analyzed by GC. As a result, it was proved that the conversion of nBA was 100%.

GPC-UV (254 nm) measurement of the resultant polymer component proved that this polymer component was a mixture of a block copolymer having a number average molecular weight (Mn), reduced to polystyrene, of 29500 and a polymer having a number average molecular weight (Mn), reduced to polystyrene, of 5600 and originating from the polymerization initiator compound (polystyrene having a 1,1-diphenylethylene fragment at its terminal) and the weight ratio between them was 75/25. This fact demonstrated that the block efficiency in the block copolymerization was 75%.

As is evident from Examples 11–15, according to the polymerization process (Y) of the present invention, (meth) acrylic esters such as methyl methacrylate or n-butyl acrylate can be anionically polymerized with a high initiation efficiency and a high living polymerization property in a solvent which can easily be recovered and reused under a mild cooling condition, for example, under a temperature condition of −30 to 0°0 C., using an organic alkali metal compound which has relatively good convenience. Accordingly, according to this polymerization process, (meth)acrylic esters can be subjected to living anionic polymerization, using any one of initiators having various structures, so that (meth)acrylic ester polymers, such as a block copolymer or the like, can be produced with industrial profitability.

What is claimed is:

1. A process for anionically polymerizing a methacrylic ester or an acrylic ester comprising reacting:
a methacrylic ester or an acrylic ester in the presence of a polymerization initiator comprising the reaction product of a conjugated diene and an organic alkali metal compound and a tertiary organoaluminum compound comprising Al—O—Ar, wherein Ar is an aromatic group.

2. The process of claim 1, herein the methacrylic ester is an ester of primary alcohol and methacrylic acid.

3. The process of claim 1, wherein the acrylic ester is an ester of primary alcohol and acrylic acid.

4. The process of claim 1, wherein said organic alkali metal compound is an organic lithium compound.

5. The process of claim 1, wherein said tertiary organoaluminum compound in which two or more of the three bonds of the aluminum atom are bonded through an oxygen atom to an aromatic ring.

6. The process of claim 1, wherein said conjugated diene compound is 1,3-butadiene.

7. The process of claim 1, wherein said conjugated diene compound is isoprene.

8. The process of claim 1, wherein a part of said tertiary organoaluminium compound is admixed with said methacrylic ester or acrylic ester to form a mixture, and the mixture is added to said polymerization initiator.

9. The process of claim 1, wherein the polymer produced is a block copolymer comprising a methacrylic ester and an acrylic ester.

10. The process of claim 1, wherein an ether compound or a tertiary polyamine compound is added to the polymerization initiator and the tertiary organoaluminium mixture.

11. The ether compound of claim 10 that is 1,2-dimethoxyethane.

12. The tertiary organoaluminium compound in claim 1 that is diisobutyl (2,6-di-t-butyl-4-methylphenoxy) aluminum.

13. The tertiary organoaluminium compound of claim 1 that is isobutyl(2,6-di-t-butyl-4-methylphenoxy)aluminum.

14. The block copolymer produced in claim 9, wherein at least one block is poly(methylmethacrylate).

15. The block copolymer produced in claim 9, wherein at least one block is poly(butylacrylate).

* * * * *